United States Patent

Seki et al.

Patent Number: 5,920,170
Date of Patent: Jul. 6, 1999

[54] NUMERICAL CONTROL APPARATUS AND NUMERICAL CONTROL METHOD

[75] Inventors: Masaki Seki, Suginami-ku; Masako Sudo, Tsukuba; Syuji Matsuura, Kodaira; Kouji Yamamuro, Minamitsuru-gun, all of Japan

[73] Assignee: Yamanashi, Japan

[21] Appl. No.: 08/685,801

[22] Filed: Jul. 24, 1996

Related U.S. Application Data

[63] Continuation of application No. 08/244,311, May 25, 1994, abandoned.

[30] Foreign Application Priority Data

| Oct. 8, 1992 | [JP] | Japan | 4-270361 |
| Oct. 8, 1992 | [JP] | Japan | 4-271325 |
| Oct. 9, 1992 | [JP] | Japan | 4-271324 |
| Oct. 12, 1992 | [JP] | Japan | 4-272590 |

[51] Int. Cl.$^6$ ................. G05B 19/18
[52] U.S. Cl. ........... 318/568.15; 318/573; 318/574; 364/474.31; 364/474.32
[58] Field of Search .......... 364/474.29, 474.31, 364/474.11, 474.06, 474.02, 474.35, 474.32; 318/573, 569, 568.1, 570, 568.15, 574; 901/1, 2, 3, 9, 10

[56] References Cited

U.S. PATENT DOCUMENTS

| 3,783,253 | 1/1974 | Anderson et al. |
| 4,178,820 | 12/1979 | Gerber. |
| 4,201,937 | 5/1980 | Irie ................ 318/573 |
| 4,250,551 | 2/1981 | Paveglio et al. ................ 318/569 |
| 4,490,781 | 12/1984 | Kishi et al. |
| 4,521,721 | 6/1985 | Kinoshita ................ 318/573 |
| 4,608,643 | 8/1986 | Breitenstein et al. |
| 5,295,076 | 3/1994 | Gruener et al. ................ 364/474.29 |

FOREIGN PATENT DOCUMENTS

| 063 606 | 11/1982 | European Pat. Off. |
| 56-15630 | 2/1981 | Japan. |
| 62-246451 | 10/1987 | Japan. |
| 63-296107 | 12/1988 | Japan. |
| 1 369 194 | 10/1974 | United Kingdom. |
| 2 054 199 | 2/1981 | United Kingdom. |
| 2 176 911 | 7/1987 | United Kingdom. |
| 2 216 276 | 10/1989 | United Kingdom. |

*Primary Examiner*—John W. Cabeca
*Attorney, Agent, or Firm*—Staas & Halsey

[57] ABSTRACT

A numerical control apparatus enables a tool to move parallel or vertical to a designated shape to easily carry out a machining of a prototype using general-purpose machine tools. A graphic storing device displays guidance information on a display unit through a graphic control circuit and also stores a designated shape such as an oblique straight line or a circular arc entered by the operator through a keyboard in an interactive fashion. On the detection of a pulse signal HP from a manual pulse generator, an interpolation device reads a changeover signal H/V for commanding one of the parallel movement or the vertical movement of the tool from a changeover device. Then, the interpolation device outputs an interpolated pulse signal CP corresponding to the pulse signal HP and changeover signal H/V in accordance with the designated shape stored in the graphic storing device and supplies the interpolated pulse signal HP to an axis control circuit.

16 Claims, 17 Drawing Sheets

NUMERICAL CONTROL APPARATUS AND NUMERICAL CONTROL METHOD

This application is a continuation of application Ser. No. 08/244,311, filed May 25, 1994, now abandoned.

BACKGROUND OF THE INVENTION

1. Field of the Invention

The present invention relates to a numerical control apparatus and a numerical control method for controlling a machine tool, and more particularly to a numerical control apparatus and a numerical control method for controlling a machine tool which machines prototypes or the like.

2. Background Description of the Related Art

Advances in the technology of numerically controlled machine tools have been so great that they can machine workpieces of complex shape at high speed with precision. At present, workpieces of complex shape cannot be machined without numerically controlled machine tools.

To generate machining programs, there are widely used interactive numerical control apparatus which comprise a numerical control apparatus with an interactive program generating function, and automatic programming apparatuses for simply generating complex machining programs.

In the use of such numerical control apparatuses, it is necessary to accurately define machine coordinates, a machine origin, program coordinates, a machining origin, and other data for generating strict machining programs. Although the interactive numerical control apparatus and the automatic programming apparatus can be used to machine a number of workpieces, for some machining processes for producing a prototype or a model, general-purpose milling machines, lathes and the like are used which require a short period of time to carry out preparatory action such as attachment and detachment of workpieces, installation of tools, etc. these processes, and do not require machining programs to be generated.

Problems of general-purpose machine tools are that the number of available operators who can handle general-purpose machine tools is becoming smaller, and it is difficult for the general-purpose machine tools to carry out oblique linear machining, arcuate machining, or the like though they can effect linear machining without any problem.

If, on the other hand, a general numerically controlled machine tool is used to machine a prototype or a model, then it is necessary to accurately define machine coordinates, a machine origin, program coordinates, a machining origin, and other data. While it is not impossible to define those data, the required programming process is too time-consuming and troublesome for machining a portion of a single workpiece.

To solve the above problems, the applicant has filed Japanese Patent Application No. 4-231836 on a numerical control apparatus which employs a general-purpose machine tool for carrying out simple machining processes to machine prototypes or the like.

When a simple machining of prototypes or the like is carried out, however, the machining is usually carried out while sequentially confirming machining processes by operating a manual pulse generator or jog feed buttons. Therefore, although it is possible to move a tool in a direction parallel to any one of an X-axis, a Y-axis and a Z-axis by operating the manual pulse generator or the jog feed buttons, it is difficult to move the tool along an oblique straight line, circular arc or the like by simultaneously driving two or more axes by hand.

It is also difficult to move a tool to a machining start point by moving it with respect to two or more axes along a designated shape such as an oblique straight line, circular arc or the like.

Further, when a simple machining of prototypes or the like is carried out while sequentially confirming machining processes by operating the manual pulse generator or the jog feed buttons, a distance between a designated shape such as a defined oblique straight line, circular arc or the like and the present position of a tool is unknown. As a result, it is difficult to cause the tool to approach the designated shape by operating the manual pulse generator or the jog feed buttons.

In such a numerical control apparatus, a tool is caused to approach a workpiece by operating the manual pulse generator or the jog feed buttons until the tool reaches the vicinity of a cutting start point. When the tool is caused to come into contact with the workpiece carelessly, however, a problem arises in that a cutter mark is formed to the workpiece and the workpiece is machined badly. This is a serious problem when the workpiece is subjected to a finish machining.

SUMMARY OF THE INVENTION

In view of the above problems, it is an object of the present invention to provide a numerical control apparatus and numerical control method capable of moving a tool parallel or vertical to a designated shape to easily carry out a simple machining of a prototype or the like using general-purpose machine tools.

Another object of the present invention is to provide a numerical control apparatus capable of moving a tool to a machining start point along a designated shape to easily carry out a simple machining of a prototype or the like using general-purpose machine tools.

A further object of the present invention is to provide a numerical control apparatus capable of finding a distance between a designated shape and the present position of a tool to easily carry out a simple machining of a prototype or the like using general-purpose machine tools.

A still further object of the present invention is to provide a numerical control apparatus capable of finishing a workpiece to a good machined shape when a simple machining of a prototype or the like is carried out using general-purpose machine tools.

To solve the above problems, there is provided in accordance with the present invention a numerical control apparatus for controlling a machine tool having at least two axes, comprising graphic storing means for storing a designated shape such as an oblique straight line, circular arc or the like entered in an interactive fashion in accordance with guidance information, changeover means for outputting a changeover signal commanding any one of the parallel movement of a tool for moving while keeping a distance between the present position of the tool and the designated shape and the vertical movement of the tool for moving forwardly or backwardly of a direction indicated by a normal line segment from the present position of the tool to the designated shape, movement command means for outputting a pulse signal commanding movement of the tool, and interpolation means for outputting an interpolated pulse signal in response to the changeover signal and the pulse signal.

Further, there is provided a numerical control method of controlling a machine tool having at least two axes, comprising the steps of storing a designated shape such as an oblique straight line, circular arc or the like entered in an interactive fashion in accordance with guidance information, outputting, when an axis signal commanding any of at least two control axes and a pulse signal commanding the movement of a tool are received, an interpolated pulse signal in accordance with the axis signal, and outputting, when a changeover signal commanding any one of the parallel movement of the tool for moving while keeping a distance between the present position of the tool and the designated shape and the vertical movement of the tool for moving forwardly or backwardly of a direction indicated by a normal line segment from the present position of the tool to the designated shape and a pulse signal commanding the movement of the tool are received, an interpolated pulse signal in response to the changeover signal and the pulse signal.

In the numerical control apparatus, when a designated shape such as an oblique straight line, circular arc or the like is entered in an interactive fashion through a keyboard or the like in accordance with guidance information displayed on a display unit, the graphic storing means stores the designated shape. The changeover means outputs a changeover signal commanding any one of the parallel movement of a tool for moving while keeping a distance between the present position of the tool and the designated shape and the vertical movement of the tool for moving forwardly or backwardly of a direction indicated by a normal line segment from the present position of the tool to the designated shape. The movement command means outputs a pulse signal commanding the movement of the tool. The interpolation means outputs an interpolated pulse signal in response to the changeover signal and the pulse signal.

In the numerical control method, a designated shape such as an oblique straight line, circular arc or the like is stored which is entered in an interactive fashion through a keyboard or the like in accordance with guidance information displayed on a display unit. Thereafter, when an axis signal commanding any of at least two control axes and a pulse signal commanding the movement of a tool are received, an interpolated pulse signal is output in accordance with the axis signal. On the other hand, when a changeover signal commanding any one of the parallel movement of the tool for moving while keeping a distance between the present position of the tool and the designated shape and the vertical movement of the tool for moving forwardly or backwardly of a direction indicated by a normal line segment from the present position of the tool to the designated shape and a pulse signal commanding the movement of the tool are received, an interpolated pulse signal is output in accordance with the changeover signal from movement command means and the pulse signal.

With this arrangement, a tool can be moved parallel or vertical to a designated shape to easily carry out some simple machining processes for producing a prototype or the like.

DETAILED DESCRIPTION OF THE PREFERRED EMBODIMENT

An embodiment of the present invention will be described below with reference to the drawings.

Figure 1:
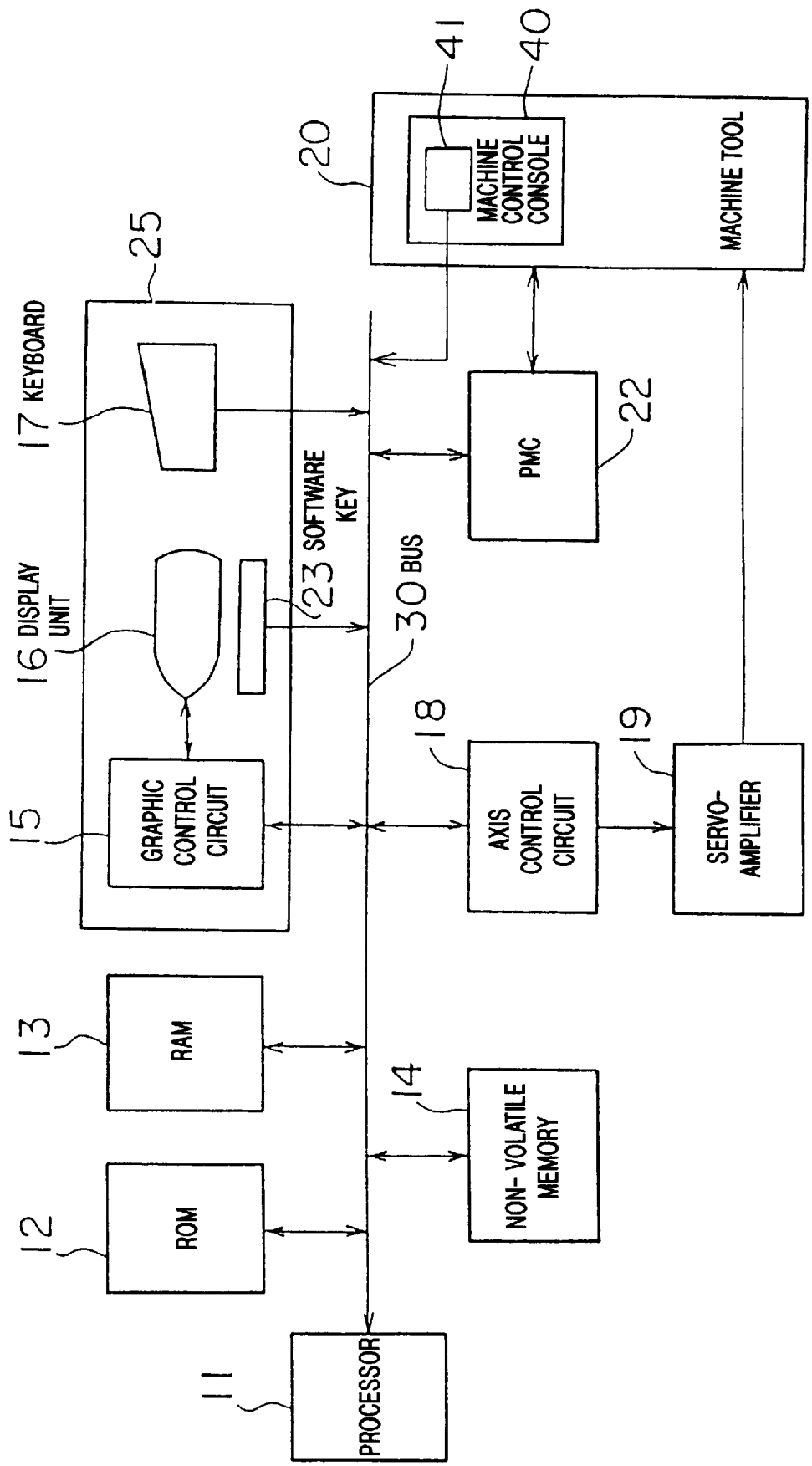
FIG. 1 is a block diagram showing a hardware arrangement of a numerical control apparatus embodying the present invention.

FIG. 1 is a block diagram showing a hardware arrangement of a numerical control apparatus embodying the present invention.

A processor 11 controls the numerical control apparatus in its entirety according to a system program stored in a ROM 12. The ROM 12 comprises an EPROM or an EEPROM. A RAM 13, which comprises an SRAM or the like, stores temporary data such as input and output signals and the like. A nonvolatile memory 14 comprises a CMOS that is backed up by a battery (not shown). The nonvolatile memory 14 stores various data such as parameters, machining programs, etc. which are to be retained after the power supply is turned off.

A graphic control circuit 15 converts guidance information, designated shape entered, and the like into a displayable signal, and supplies the displayable signal to a display unit 16. The display unit 16 comprises a CRT or a liquid crystal display panel. An axis control circuit 18 (for three axes) receives axis movement commands including an interpolated pulse signal CP from the processor 11 and outputs the axis movement commands to a servoamplifier 19 (for three axes). In response to the axis movement commands, the servoamplifier 19 energizes the servomotors (not shown) on a machine tool 20. The machine tool 20 has, in addition to the servomotors, a machine control console 40 operable for entering movement commands. The machine control console 40 includes a manual pulse generator 41 and the like as described in detail later on. These components are interconnected by a bus 30.

A PMC (programmable machine controller) 22 receives a T function signal (tool selection command) and the like through the bus 30 when a machining program is to be executed. The PMC processes the received signal according to a sequence program, and outputs a signal as an operation command to control the machine tool 20. Further, the PMC receives state signals from the machine tool 20, sequentially processes the state signals and transfers necessary input signals to the processor 11 through the bus 30.

To the bus 30, there is also connected a software key 23 whose function varies depending on the system program and the like. The software key 23, the display unit 16, and the keyboard 17 are mounted on a CRT/MDI panel 25.

Figure 2:
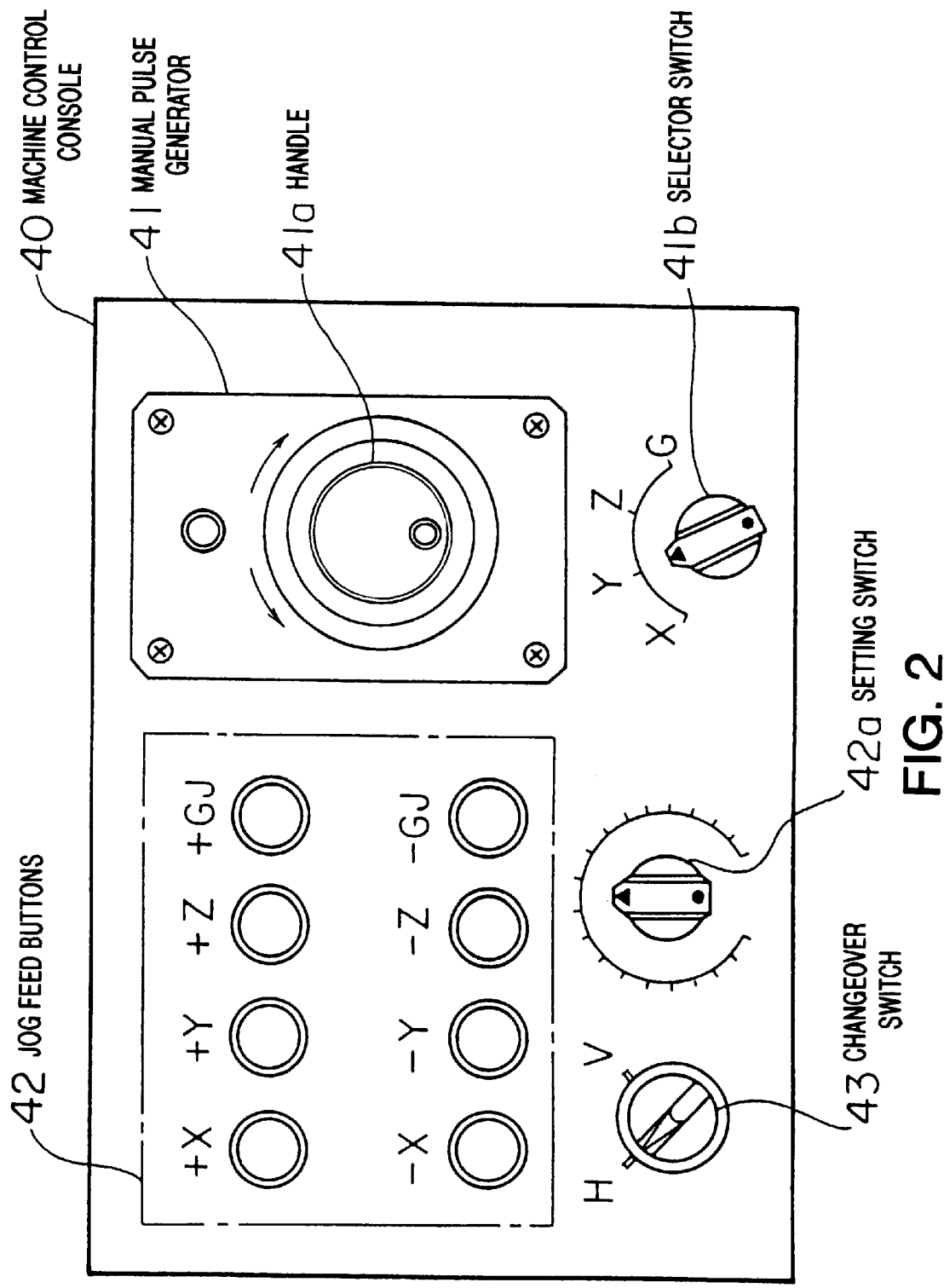
FIG. 2 is a view showing a machine control console by way of example.

FIG. 2 is a view showing the machine control console 40 on the machine tool 20 by way of example. The machine control console 40 shown in FIG. 2 has the manual pulse generator 41, a selector switch 41b, jog feed buttons 42, a setting switch 42a, and a changeover switch 43.

When a handle 41a is turned to the left or right, the manual pulse generator 41 generates a pulse signal depending on the rotation of the handle 41a. The pulse signal, which is composed of two-phase pulses for determining the direction in which the handle 41a is turned, is sent through the bus 30 to the processor 11 for moving a tool. The selector switch 41b is a switch for selecting a pulse signal generated by the manual pulse generator 41 in either an X-axis direction (X), a Y-axis direction (Y), a Z-axis direction (Z), or a direction (G) corresponding to a designated shape.

The jog feed buttons 42 comprise a total of 8 buttons including positive and negative feed buttons "+X", "−X", "+Y", "−Y", "+Z", and "−Z" for the respective X-, Y-, and Z-axes, and positive and negative feed buttons "+GJ", "−GJ" corresponding to the designated shape.

The setting switch 42a sets the number of pulses in a certain period of time which are generated when the jog feed buttons 42 are pressed by the operator. Specifically, the setting switch 42a receives a pulse obtained by dividing a pulse from a crystal oscillator (not shown) and outputs the pulse in a dividing ratio in accordance with a scale set by the operator. That is, the setting switch 42a sets a jogging feed rate.

The changeover switch 43 changes the parallel movement (H) of a tool which moves while keeping a distance between the present position of the tool and a designated shape and the vertical movement (V) of a tool which moves forwardly or backwardly of a direction shown by a normal line segment from the present position of the tool to a designated shape and outputs a changeover signal H/V corresponding to a changed side.

Therefore, when the operator moves a tool by the manual pulse generator 41, the operator first sets the selector switch 41b and changeover switch 43 to a desired moving direction and then turns the handle 41a. Further, when the operator moves the tool by a jog feed, the operator sets a feed rate by the setting switch 42a and then presses the button having a desired direction of the jog feed buttons 42.

Next, a moving direction of a tool will be described with respect to the case in which the selector switch 41b on the machine control console 40 is set to the direction (G) corresponding to the designated shape and the handle 41a is turned and the case in which the positive and negative feed buttons "+GJ" and "−GJ" of the jog feed buttons 42 are pressed in correspondence to the designated shape. Since the same operation is carried out when the handle 41a is turned and when the jog feed buttons 42 are pressed, the case in which the handle 41a is turned will be described here.

Figure 3:
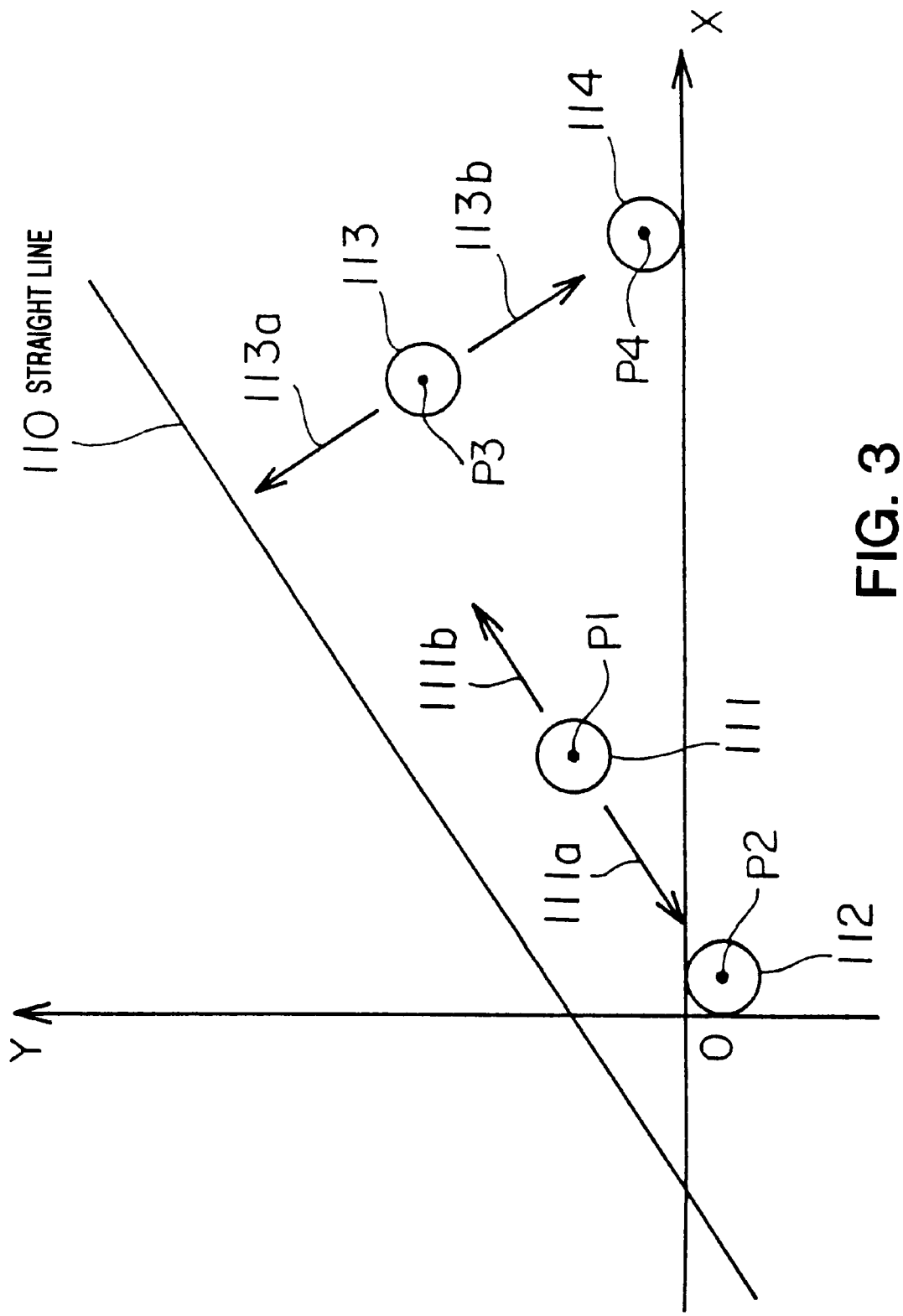
FIG. 3 is a view showing directions in which tools are moved.

FIG. 3 is a view showing directions in which tools are moved, wherein a straight line is defined as a designated shape.

In FIG. 3, a straight line 110 is defined as a designated shape on the plane of X- and Y-coordinate axes. The straight line 110 is a graphic (designed shape) which is read by graphic storing means 1 to be described later (FIG. 6) and stored therein. A tool 111 has a center located at a position P1 and a tool 113 has a center located at a position P3.

At this time, when the selector switch 41b of FIG. 2 is set to the "G" side, the changeover switch 43 is set to the "H (parallel movement)" side and the handle 41a is turned to the left, the tool 111 moves in a direction 111a in parallel to the straight line 110 in accordance with a turning angle of the handle 41a. Conversely, when the handle 41a is turned to the right, the tool 111 moves in a direction 111b in parallel to the straight line 110 in accordance with a turning angle of the handle 41a.

When the changeover switch 43 is set to the "V (vertical movement)" side and the handle 41a is turned to the left, the tool 113 moves in a normal direction 113a with respect to the straight line 110 in accordance with a turning angle of the handle 41a. Conversely, when the handle 41a is turned to the right, the tool 113 moves in a normal direction 113b with respect to the straight line 110 in accordance with a turning angle of the handle 41a.

A direction in which a tool is to be moved when the handle 41a is turned to the right or to the left can be designated to any one of the right and left directions by an input effected by the operator in accordance with a parameter or guidance information. For example, in the vertical movement of a tool, whether it is to be moved in the direction 113a or in the direction 113b when the handle 41a is turned to the right can be designated in accordance with the parameter or guidance information. With this arrangement, operability can be improved.

Note, the movement of a tool carried out by means of the handle 41a may be arranged such that an interpolated pulse signal output from interpolation means 2 (FIG. 6) to be described later is stopped by a predetermined coordinate value. For example, when the predetermined coordinate value is set to "0" on the X-coordinate, the tool 112 is stopped at a position P2 and cannot be further moved in the direction 111a even if the handle 41a is turned to the left. As apparent from FIG. 3, the position P2 where the tool 112 is located does not have an X-coordinate value "0" but the tool 112 is located at a position corrected in the positive direction along the X-axis by a tool diameter (radius).

In the same way, when the predetermined coordinate value is set to "0" on the Y-coordinate, a tool 114 is stopped at a position P4 and cannot be further moved in the direction 113a even if the handle 41a is turned to the right. Further, the position P4 where the tool 114 is located does not have a Y-coordinate value "0" but the tool 114 is located at a position corrected in the positive direction along the Y-axis by a tool diameter (radius).

With the provision of the limited coordinate value represented by the above predetermined coordinate value, even if the operator carries out an improper operation through the machine control console 40, the movement of a tool to an improper position can be prevented.

Figure 4:
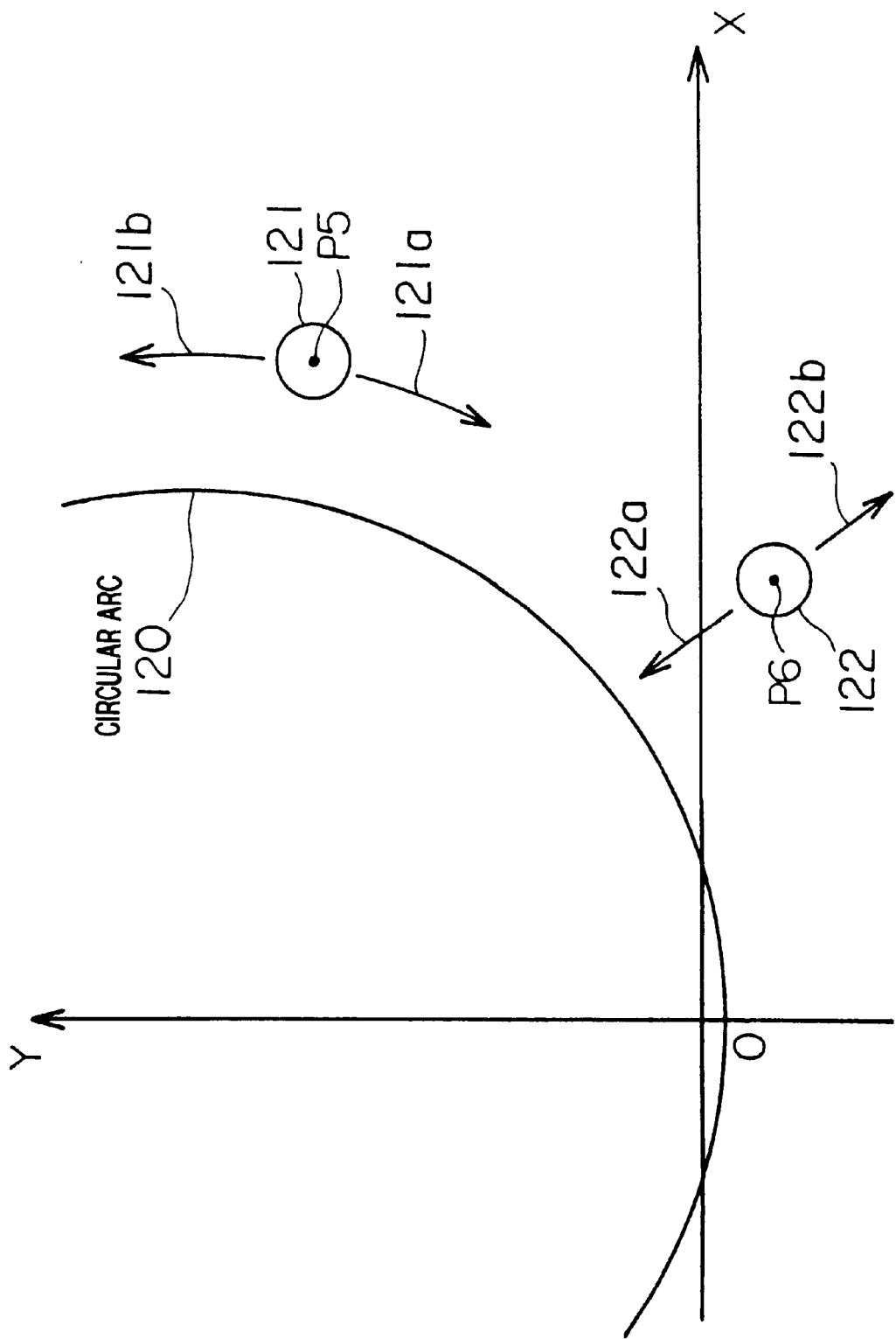
FIG. 4 is a view showing directions in which tools are moved.

FIG. 4 is a view showing directions in which tools are moved, wherein a circular arc 120 is defined as a designated shape on the plane of X- and Y-coordinate axes. The circular arc 120 is a graphic (designed shape) read by the graphic storing means 1 to be described later (FIG. 6) and stored therein. A tool 121 has a center located at a position P5 and a tool 122 has a center located at a position P6.

At this time, when the selector switch 41b of FIG. 2 is set to the "G" side, the changeover switch 43 is set to the "H (parallel movement)" side and the handle 41a is turned to the left, the tool 121 moves in a direction 121a while keeping a predetermined interval between the tool 121 and the circular arc 120 in accordance with a turning angle of the handle 41a. Conversely, when the handle 41a is turned to the right, the tool 121 moves in a direction 121b while keeping the predetermined interval between the tool 121 and the circular arc 120 in accordance with a turning angle of the handle 41a. Note, the predetermined interval in this case corresponds to a normal line segment between the position of the tool 121 and the circular arc 120.

When the changeover switch 43 is set to the "V (vertical movement)" side and the handle 41a is turned to the left, the tool 122 moves in a normal direction 122a with respect to the circular arc 120 in accordance with a turning angle of the handle 41a. Conversely, when the handle 41a is turned to the right, the tool 122 moves in a normal direction 122b with respect to the circular arc 120 in accordance with a turning angle of the handle 41a.

With this arrangement, a tool can be moved along an oblique straight line, circular arc or the like by simultaneously driving with respect to two or more axes when the manual pulse generator or the jog feed buttons are operated.

Figure 5:
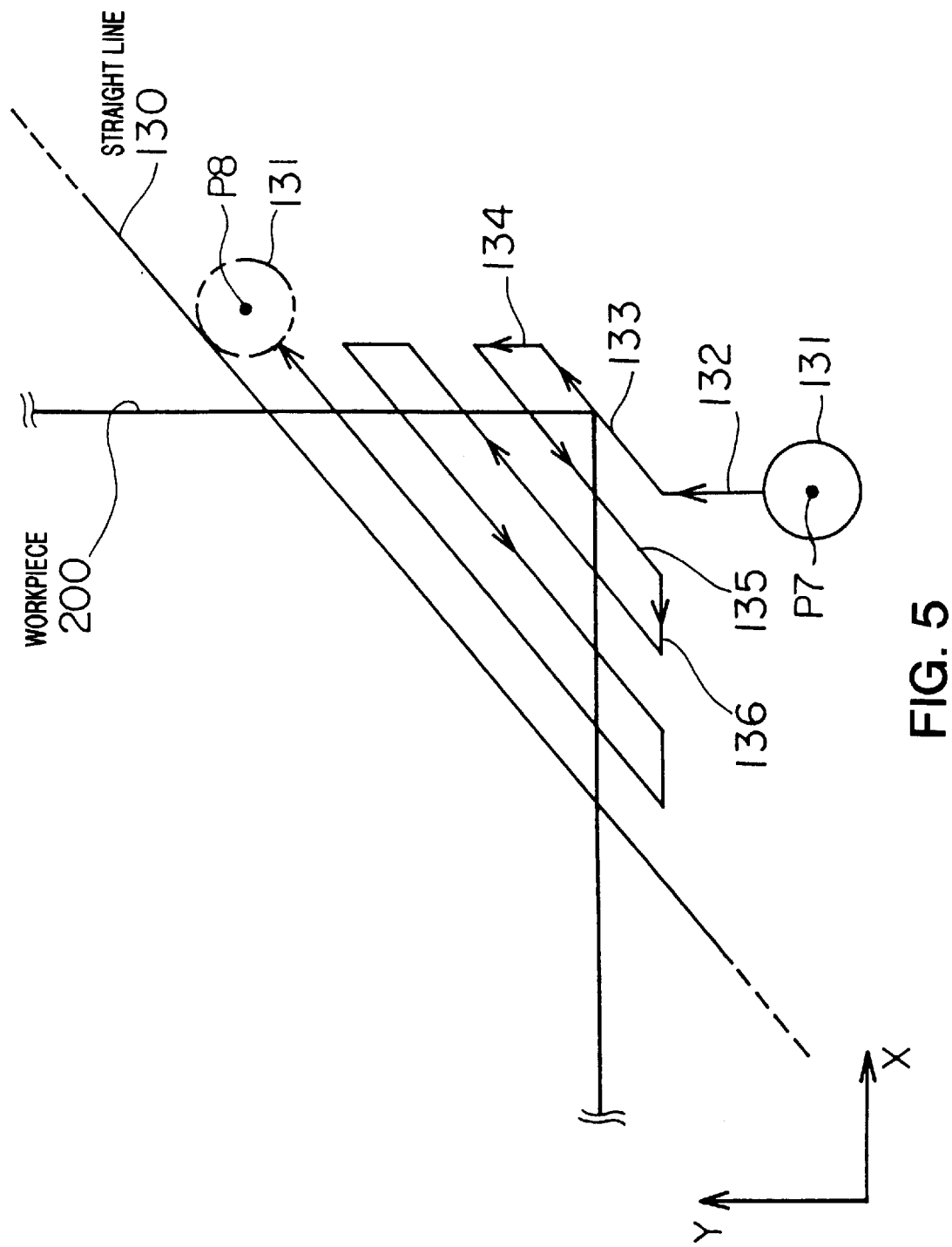
FIG. 5 is a diagram explaining a machining operation actually carried out by the operator.

FIG. 5 is a diagram explaining a machining operation actually carried out by the operator.

In FIG. 5, a straight line 130 is defined as a designated shape to machine the lower right portion of a workpiece 200. The straight line 130 is a graphic (designated shape) read by the graphic storing means 1 (FIG. 6) to be described later and stored therein. At first, a tool 131 has a center located at a position P7.

The operator sets the selector switch 41b of FIG. 2 to the "Y" side and turns the handle 41a to the right to carry out an approach operation. At this time, the tool 131 moves in a direction 132. Next, the operator sets the selector switch 41b to the "G" side and turns the handle 41a to the right to move the tool 131 in a direction 133 to thereby carry out a first machining.

Then, the operator sets the selector switch 41b to the "Y" side again, turns the handle 41a to the right to carry out a next machining, and moves the tool 131 in a direction 134. Thereafter, the operator sets the selector switch 41b to the "G" side, turns the handle 41a to the left to move the tool 131 in a direction 135 to thereby carry out a second machining. Then, the operator sets the selector switch 41b to the "X" side and turns the handle 41a to the left to carry out a next machining, and moves the tool 131 in a direction 136.

The tool 131 is finally moved to a position P8 by the repetition of the aforesaid operations so that the lower right portion of the workpiece 200 is machined. Consequently, a prototype or the like can be machined in a more complex sequence by repeatedly carrying out a cutting depth setting motion (movement parallel to machining axes) and a cutting motion (movement parallel to a designated shape).

Next, a processing sequence for the operator to move a tool by operating the manual pulse generator 41 will be described.

Figure 6:
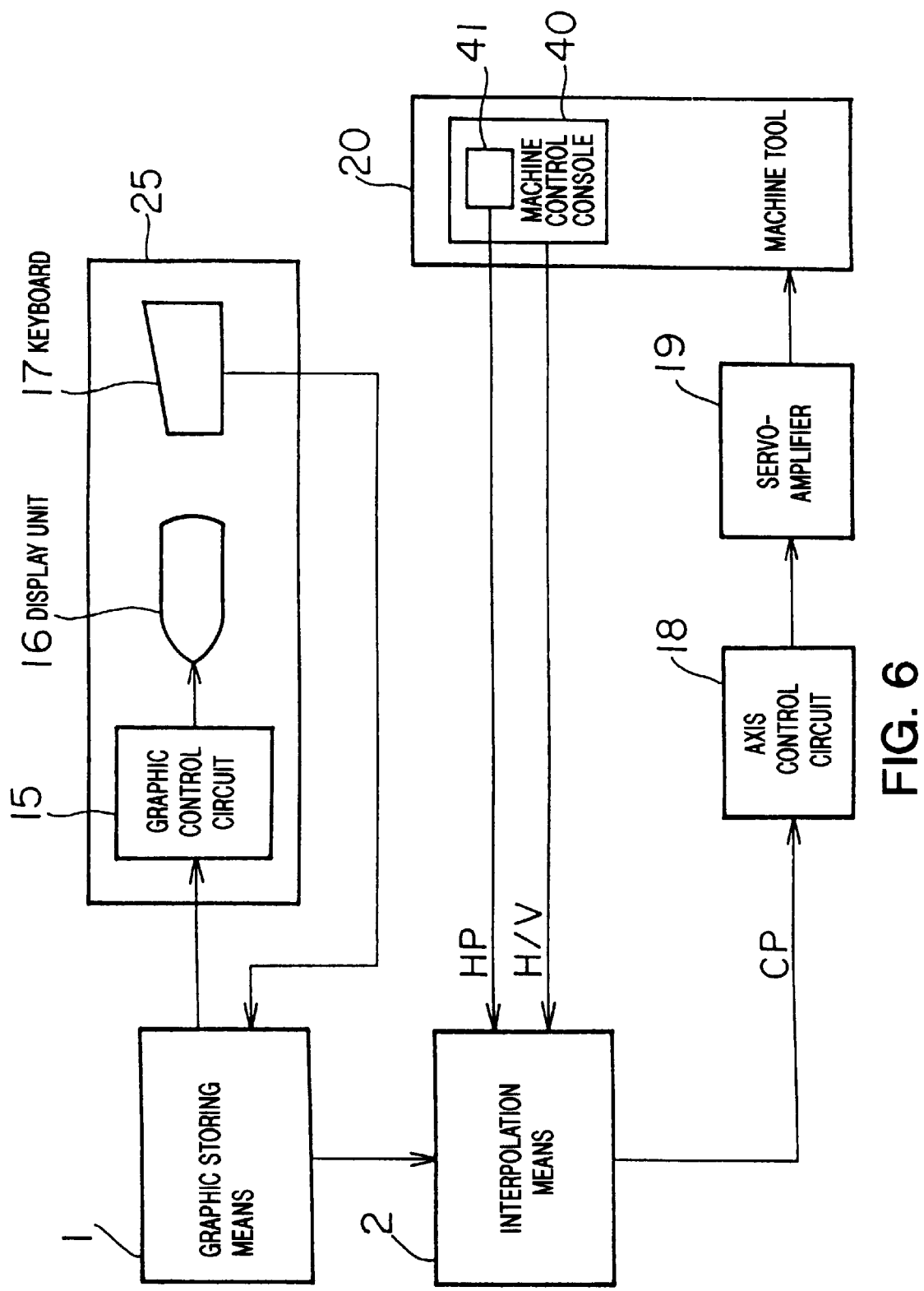
FIG. 6 is a block diagram showing a function of a numerical control apparatus of a first embodiment.

FIG. 6 is a block diagram showing a function of a numerical control apparatus of a first embodiment.

Graphic storing means 1 displays guidance information on a display unit 16 through a graphic control circuit 15. The graphic storing means 1 also stores a designated shape such as an oblique straight line, circular arc or the like which is entered by the operator through a keyboard 17 in an interactive fashion. The designated shape stored is displayed on the display unit 16 through the graphic control circuit 15 when necessary.

Interpolation means 2 reads a changeover signal H/V which commands any one of a horizontal movement and a vertical movement in response to a pulse signal HP detected from movement command means such as a manual pulse generator 41 or the like. The interpolation means 2 outputs an interpolated pulse signal CP in accordance with the designated shape stored in the graphic storing means 1 and the changeover signal H/V and supplies the interpolated pulse signal CP to an axis control circuit 18. The axis control circuit 18 is actually provided for each of three axes. The axis control circuit 18 generates a speed command for each axis in response to the interpolated pulse signal CP output from the interpolation means 2 and supplies the speed command to a servoamplifier 19. The servoamplifier 19 controls a machine tool 20 by energizing servomotors mounted thereon. The graphic storing means 1 and interpolation means 2 of FIG. 6 are realized as the function of software executed by a processor 11 by means of the system program stored in a ROM 12.

Figure 7:
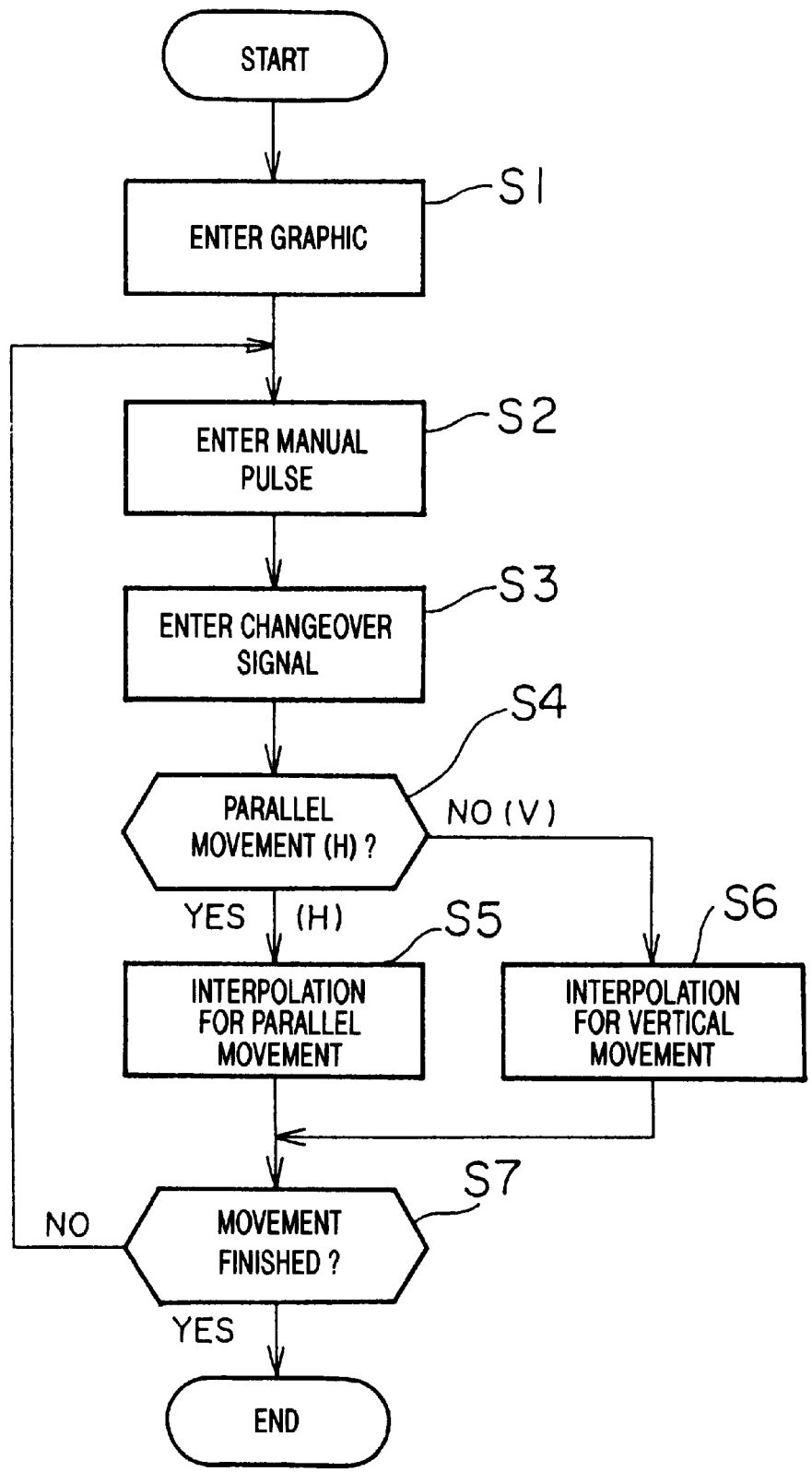
FIG. 7 is a view showing a flowchart of the first embodiment.

FIG. 7 is a flowchart of a processing sequence of the first embodiment. The flowchart shows a processing sequence to be carried out by the graphic storing means 1 and interpolation means 2 shown in FIG. 6. Note, step S1 is executed by the graphic storing means 1 and the other steps are executed by the interpolation means 2. In FIG. 7, each numeral following the letter "S" represents a step number.

[S1] A graphic is entered. Specifically, a designated shape such as an oblique straight line, circular arc or the like entered by the operator through the keyboard 17 in an interactive fashion is stored.

[S2] A manual pulse is entered. Specifically, a pulse signal HP from the manual pulse generator 41 of FIG. 2 is detected.

[S3] A changeover signal is entered. Specifically, a changeover signal H/V is entered from the switches and the like on the machine control console 40 of FIG. 2.

[S4] It is determined whether the changeover signal H/V entered at step S3 is a parallel movement (H) or not. If it is the parallel movement (YES), the process goes to step S5, and if it is vertical movement (NO), the process goes to step S6.

[S5] The parallel movement (H) is interpolated. Specifically, positions parallel to the designated shape entered at step S1 are interpolated in accordance with the number of pulses of the manual pulse entered at step S2 and a turning direction and the result of the interpolation is output as an interpolated pulse signal CP.

[S6] The vertical movement is interpolated. Specifically, positions in the normal direction with respect to the designated shape entered at step S1 are interpolated in accordance with the number of pulses of the manual pulse entered at step S2 and a turning direction and output as an interpolated pulse signal CP.

[S7] It is determined whether the movement processing is finished or not. Specifically, whether a manual pulse is entered at step S2 or not is determined. If the manual pulse is entered, the movement processing is not finished (NO) and the process returns to step S2, and when the manual pulse is not entered, the movement processing is finished (YES) and this processing sequence is finished.

Although a feed rate is not described in the above description, when a designated shaped is entered by the graphic storing means 1, the feed rate can be designated by providing the column of a feed rate F on each machining guidance screen. Alternatively, the override switch of the numerical control apparatus may be used.

In the arrangement described above, the interpolation means 2 outputs the interpolated pulse signal CP in response to the pulse signal (HP) from the single movement command means and the changeover signal from the changeover means. The interpolation means 2 may be arranged such that, however, first movement command means for outputting a parallel movement signal commanding a parallel movement and second movement command means for outputting a vertical movement signal commanding a vertical movement are provided, and the interpolation means 2 receives and combines the parallel movement signal and the vertical movement signal and outputs an interpolated pulse signal CP. With this arrangement, when a cutting depth setting motion and a cutting motion are repeatedly carried out to the designated shape as shown in FIG. 5, a changeover signal need not be changed by the changeover means for each motion and the first movement command means and second movement command means can be simultaneously operated by both hands. Thus, a machining efficiency can be improved.

Although only a portion of the machining guidance function is described in the above description, it will be able to be easily understood that the others of the machining guidance function can be realized in the same way.

As described above, when the operator enters a designated shape in accordance with the guidance screen and operates the machine control console 40, the machining and the like of a portion of a prototype can be easily carried out by moving a tool along an oblique straight line, circular arc or the like through two or more axes driven simultaneously.

Although the above embodiment has been described with respect to a milling machine, the present invention is also applicable to a lathe and the like in the same way.

The above guidance function may be incorporated in an ordinary numerical control apparatus, or may be arranged as an especially inexpensive numerical control apparatus.

As described above, since the first embodiment is arranged such that the graphic storing means stores a designated shape such as an oblique straight line, circular arc or the like entered by the operator and the interpolation means outputs an interpolated pulse signal in accordance with the designated shape in response to a changeover signal from the changeover means and a pulse signal from the movement command means, when a simple machining of a prototype or the like is easily carried out using a general-purpose machine tool, a tool can be moved parallel or vertical to the designated shape.

Further, since a designated shape such as an oblique straight line, circular arc or the like entered by the operator is stored, an interpolated pulse signal in accordance with an axis signal is output when the axis signal and a pulse signal from the movement command means are received and an interpolated pulse signal for a parallel movement or vertical movement with respect to the designated shape is output when a changeover signal and a pulse signal from the movement command means are received, a prototype or the like can be machined by a more complex sequence.

Figure 8:
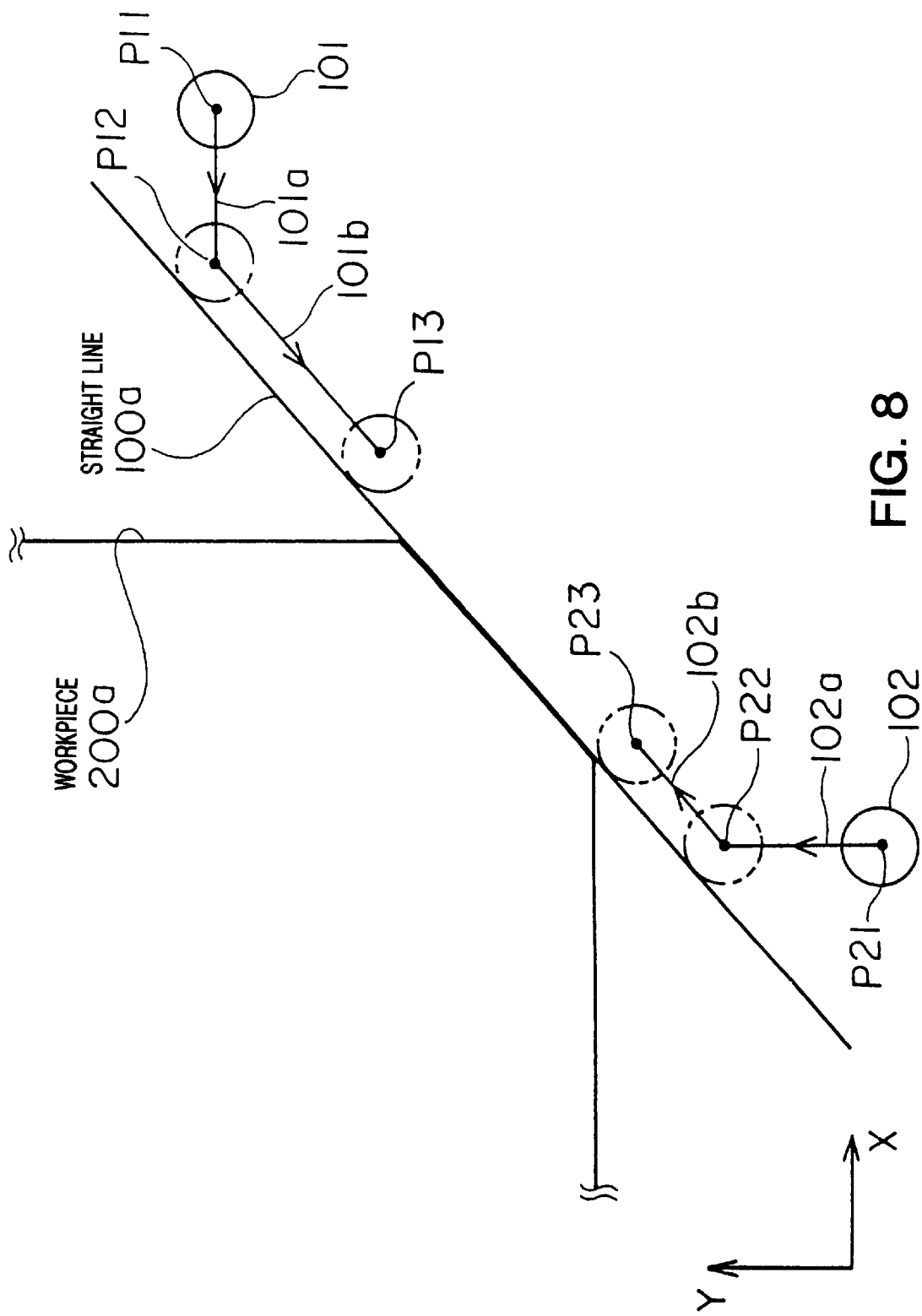
FIG. 8 is a view showing directions in which tools are moved.
Figure 9:
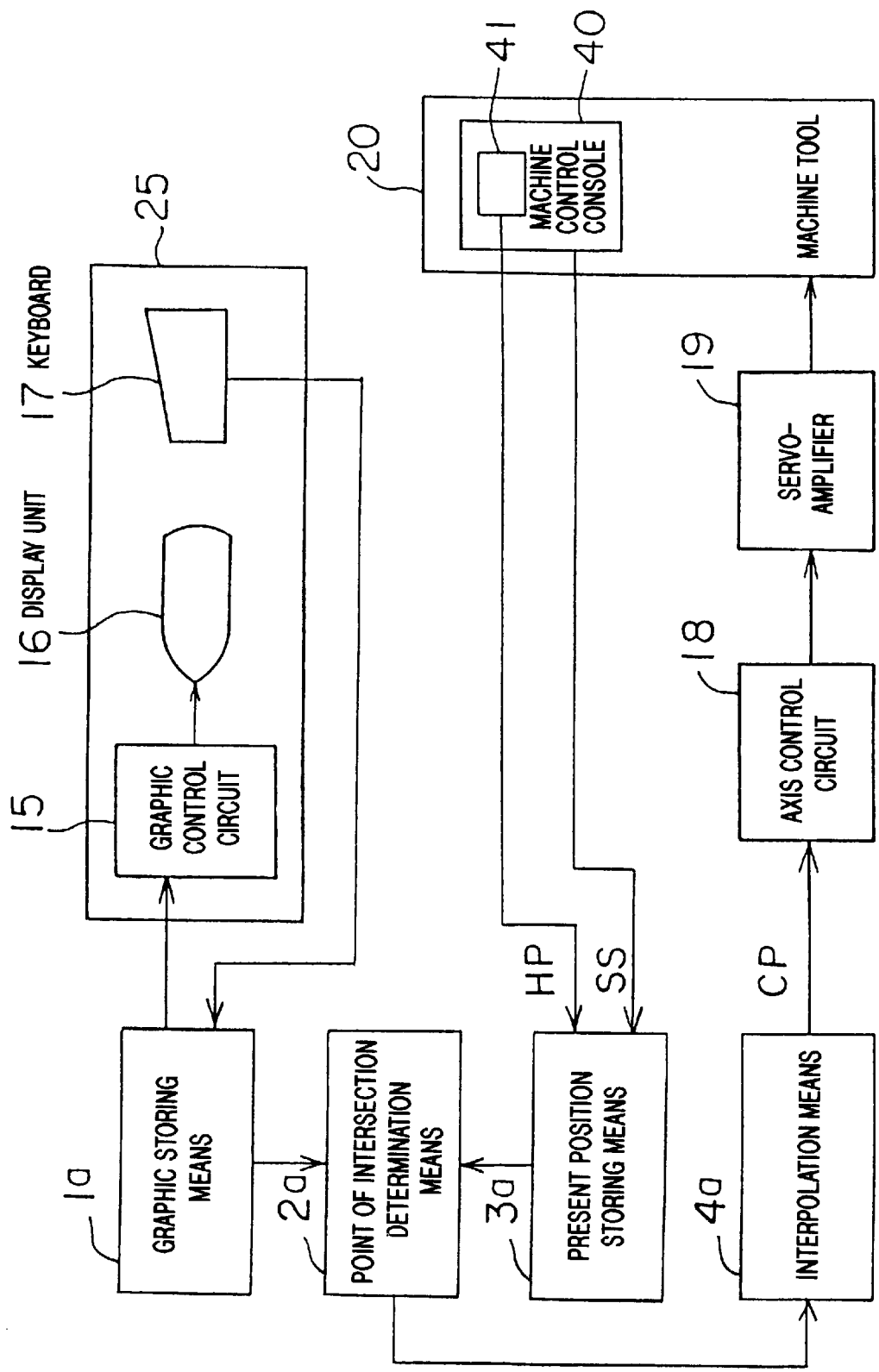
FIG. 9 is a block diagram showing a function of a numerical control apparatus of a second embodiment.

FIG. 8 is a view showing directions in which tools are moved, wherein a straight line 100a is defined as a designated shape. In FIG. 8, the straight line 100a is a graphic (designated shape) entered and stored by graphic storing means 1a to be described later (FIG. 9). A tool 101 has a center located at a position P11 and a tool 102 has a center located at a position P21.

When the handle 41a is turned to the left, the tool 101 moves in a direction 101a in parallel to the X-axis in accordance with a turning angle of the handle 41a. Thereafter, when the handle 41a is continuously turned to the left in this state, the tool 101 changes its moving direction at a position P12 where it comes into contact with the straight line 100a and moves in a direction 101b along the straight line 100a. Then, the handle 41a is continuously turned to the left until the tool 101 finally reaches a point P13 where a machining operation starts.

Next, directions in which the tool is moved will be described with respect to the case in which the selector switch 41b is set to the Y-axis (Y) and the handle 41a is turned to the right or the case in which the feed button "+Y" of the jog feed buttons 42 which has the positive direction with respect to the Y-axis is pressed. In FIG. 8, when the handle 41a is turned to the right, the tool 102 moves from the position 21 in a direction 102a in parallel to the Y-axis in accordance with a turning angle of the handle 41a. Thereafter, when the handle 41a is continuously turned to the right in this state, the tool 102 changes its moving direction at a position P22 where it comes into contact with the straight line 100a and moves in a direction 102b along the straight line 100a. Then, the handle 41a is continuously turned to the right until the tool 102 finally reaches a point P23 where a machining operation starts.

As described above, since the tools 101 and 102 move in parallel to a machining axis selected by the selector switch 41b until the present position of the tools 101 and 102 reaches the point of intersection thereof with the straight line 100a as the designated shape and thereafter the tools 101 and 102 move along the straight line 100a, the tools 101 and 102 can be easily moved to the machining start point along the designated shape. When a moving direction along the straight line 100a is different from the intention of the operator, the tools can be moved in the reverse direction by turning the handle 41a in the reverse direction. Although the tools 101, 102 are arranged to change their moving direction at the positions P12, P22 where the tools come into contact with the straight line 100a, the tools 101, 102 may change their moving direction when the center thereof reaches the straight line 100a.

In this case, since a unit vector for movement in a direction parallel to a machining axis selected by the selector switch 41b is made the same as a unit vector for movement in a direction along the straight line 100a after the present position of the tools 101, 102 reaches the straight line 100a as the designated shape, the movement from the machining axis to the designated shape can be realized without changing the switch such as the selector switch 41b or the like.

A direction in which a tool is to be moved when the handle 41a is turned to the right or to the left can be designated by an input effected by the operator in accordance with the parameter or guidance information. For example, in the movement of the tool 101, whether it is to be moved in the direction 101a or in the direction opposite to the direction 101a when the handle 41a is turned to the left can be designated in accordance with a parameter or guidance information. With this arrangement, operability can be improved.

As described above, it is possible to easily move a tool to a machining start point in such a manner that the tool is moved parallel to a machining axis, or along a designated shape such as an oblique straight line, circular arc or the like by simultaneously driving two or more axes by the operation of the manual pulse generator 41 or jog feed buttons 42.

FIG. 9 is a block diagram showing a function of a numerical control apparatus of a second embodiment.

Graphic storing means la displays guidance information on a display unit 16 through a graphic control circuit 15. Further, the graphic storing means 1a stores a designated shape entered by the operator through a keyboard 17 in an interactive fashion. The designated shape includes unit shapes such as a straight line, obliquely straight line, circle, circular arc and the like, composite shapes made by combining at least two of the unit shapes and curved shapes such as a spline curve and the like. The designated shape stored is displayed on the display unit 16 through the graphic control circuit 15 when necessary.

Present position storing means 3a renews and stores the present position of a tool (a machining axis such as the X-axis, Y-axis, Z-axis etc.) in response to a pulse signal Hp output from movement command means and a changeover signal SS output from changeover means and.

Point of intersection determination means 2a determines a point of intersection where the designated shape stored in the graphic storing means 1a intersects the present position of the tool stored in the present position storing means 3a and outputs a determination signal. Specifically, the point of intersection determination means 2a outputs a pulse signal HP as a determination signal until the present position of the tool reaches the point where it intersects the designated shape and outputs a position signal along the designated shape as the determination signal after the present position reaches the point where it intersects the designated shape. At this time, after the present position reaches the point of intersection thereof with the designated shape, the point of intersection determination means 2a outputs such a position signal that the unit vector of the pulse signal is made the same as the unit vector of the position signal as the determination signal.

Interpolation means 4a outputs an interpolated pulse signal CP in response to a determination signal from the point of intersection determination means 2a and supplies the interpolated pulse signal CP to an axis control circuit 18. The axis control circuit 18 is actually provided for each of the three axes. The axis control circuit 18 generates a speed command for each axis in response to the interpolated pulse signal CP output from the interpolation means 4a and supplies the command to a servoamplifier 19. The servoamplifier 19 controls a machine tool 20 by energizing servomotors mounted thereon.

The graphic storing means 1a, point of intersection determination means 2a, present position storing means 3a and interpolation means 4a are realized as the function of software.

Next, a processing sequence of the numerical control apparatus when the operator moves a tool by operating the manual pulse generator 41 will be described.

Figure 10:
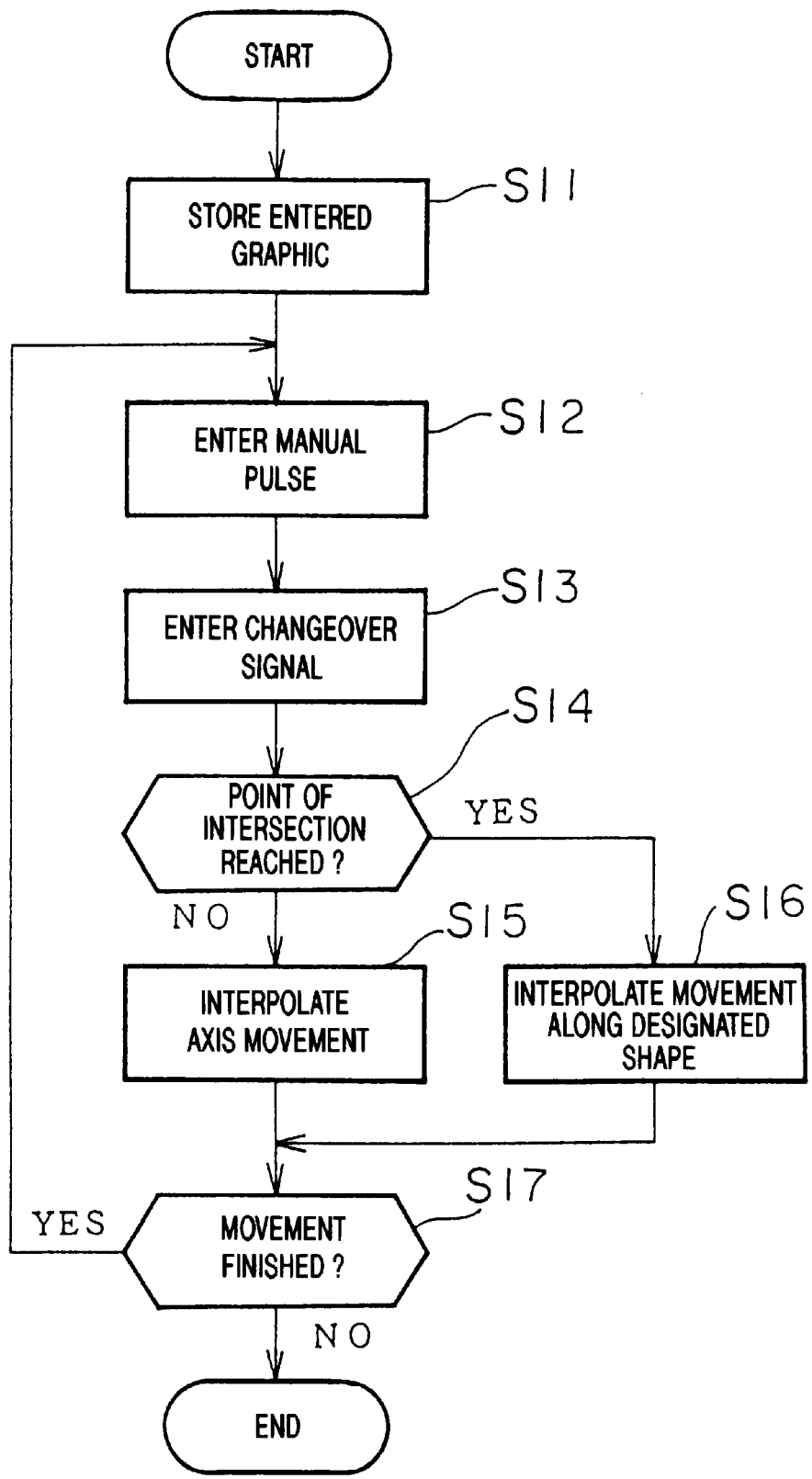
FIG. 10 is a view showing a flowchart of the second embodiment.

FIG. 10 is a flowchart showing the processing sequence of the second embodiment. The flowchart shows the processing sequence carried out by the graphic storing means 1a, point of intersection determination means 2a, present position storing means 3a and interpolation means 4a in FIG. 9. The graphic storing means 1a executes step S11, the present position storing means 3a executes steps S12 and S13, the point of intersection determination means 2a executes step S14, and the interpolation means 4a executes the other steps. In FIG. 10, each numeral following the letter "S" represents a step number.

[S11] An entered graphic is stored. Specifically, a designated shape entered by the operator through the keyboard 17 in an interactive fashion in accordance with guidance information displayed on the display unit 16 is stored. The designated shape includes unit shapes such as a straight line, oblique straight line, circle, circular arc and the like, composite shapes made by combining at least two of the unit shapes and curved shapes such as a spline curve and the like.

[S12] A manual pulse is entered. Specifically, a pulse signal HP is entered from the manual pulse generator 41 of FIG. 9.

[S13] A changeover signal is entered. Specifically, a changeover signal SS is entered from the switches and the like on the machine control console 40 of FIG. 9 as well as the present position of a tool is renewed and stored in response to the changeover signal SS and the pulse signal HP entered at step S12.

[S14] It is determined whether the present position of the tool renewed at step 13 reaches the point of intersection thereof with the designated shape stored at step S11 with the interpolation of a tool diameter. If the present position of the tool reaches the point of intersection thereof with the designated shape (YES), the process goes to step S16, and if not (NO), the process goes to step S15.

[S15] The movement of a machining axis is interpolated. Specifically, an interpolated pulse signal CP is output in response to the changeover signal SS entered at step S13 as well as the pulse signal HP entered at step S12.

[16] An interpolation processing for moving the tool along the designated shape is carried out. Specifically, positions of the tool along the designated shape entered at step S11 are interpolated in accordance with the number of pulses of the manual pulse entered at step S12 and a turning direction and the result of the interpolation is output as an interpolated pulse signal CP. At this time, a moving direction is determined such that a unit vector in the moving direction of the pulse signal HP is made the same as the a unit vector in the moving direction along the designated shape.

[S17] It is determined whether the movement processing is finished or not. Specifically, whether a manual pulse is entered at step S12 or not is determined. If the manual pulse is entered (YES), the process returns to step S12, and if the manual pulse is not entered (NO), this processing sequence is finished.

Although a feed rate is not described in the above description, when a designated shaped is entered by the graphic storing means 1a, the feed rate can be designated by providing the column of a feed rate F on each machining guidance screen. Alternatively, the override switch of the numerical control apparatus may be used.

Further, the point of intersection determination means 2a is arranged in the above description such that a unit vector in the moving direction of a pulse signal HP output from the movement command means is made the same as a unit vector in the direction along a designated shape. When a unit vector is input in accordance with a parameter or guidance information, however, any direction designated by the input unit vector can be set. With this arrangement, since a tool can be moved in a direction intended by the operator, operability can be improved.

Although only a portion of the machining guidance function is described in the above description, it will be able to be easily understood that the others of the machining guidance function can be realized in the same way.

As described above, when the operator enters a designated shape with reference to the guidance screen and operates the machine control console 40, since a tool can be moved to a machining start point along an oblique straight line, circular arc or the like by simultaneously driving two or more axes, a machining and the like of a portion of a prototype can be easily carried out.

Although the above embodiment has been described with respect to a milling machine, the present invention is also applicable to a lathe and the like in the same way.

The above guidance function may be incorporated in an ordinary numerical control apparatus, or may be arranged as an especially inexpensive numerical control apparatus.

As described above, since the second embodiment is arranged such that the graphic storing means stores a designated shape, the present position storing means renews and stores the present position of a tool in response to a pulse signal from the movement command means and a changeover signal from the changeover means, the point of intersection determination means determines a point of intersection from the above designated shape and the present position of a tool and outputs a determination signal, and the interpolation means outputs an interpolated pulse signal in accordance with the determination signal, when a simple machining of a prototype or the like is easily carried out using a general-purpose machine tool, the tool can be moved to a machining start point along an oblique straight line, circular arc or the like by simultaneously driving two or more axes.

Next, a third embodiment will be described. A distance between a designated shape and a present position of a tool will be described with reference to FIGS. 11 and 12 with respect to the case in which the handle 41a on the machine control console 40 is turned and the case in which the positive direction feed button "+G" and the negative direction feed button "−G" of the jog feed buttons 42 on the console are pressed in correspondence with a designated shape. Since the same operation is carried out when the handle 41a is turned and when the jog feed buttons 42 are pressed, the case in which the handle 41a is turned will be described here.

Figure 11:
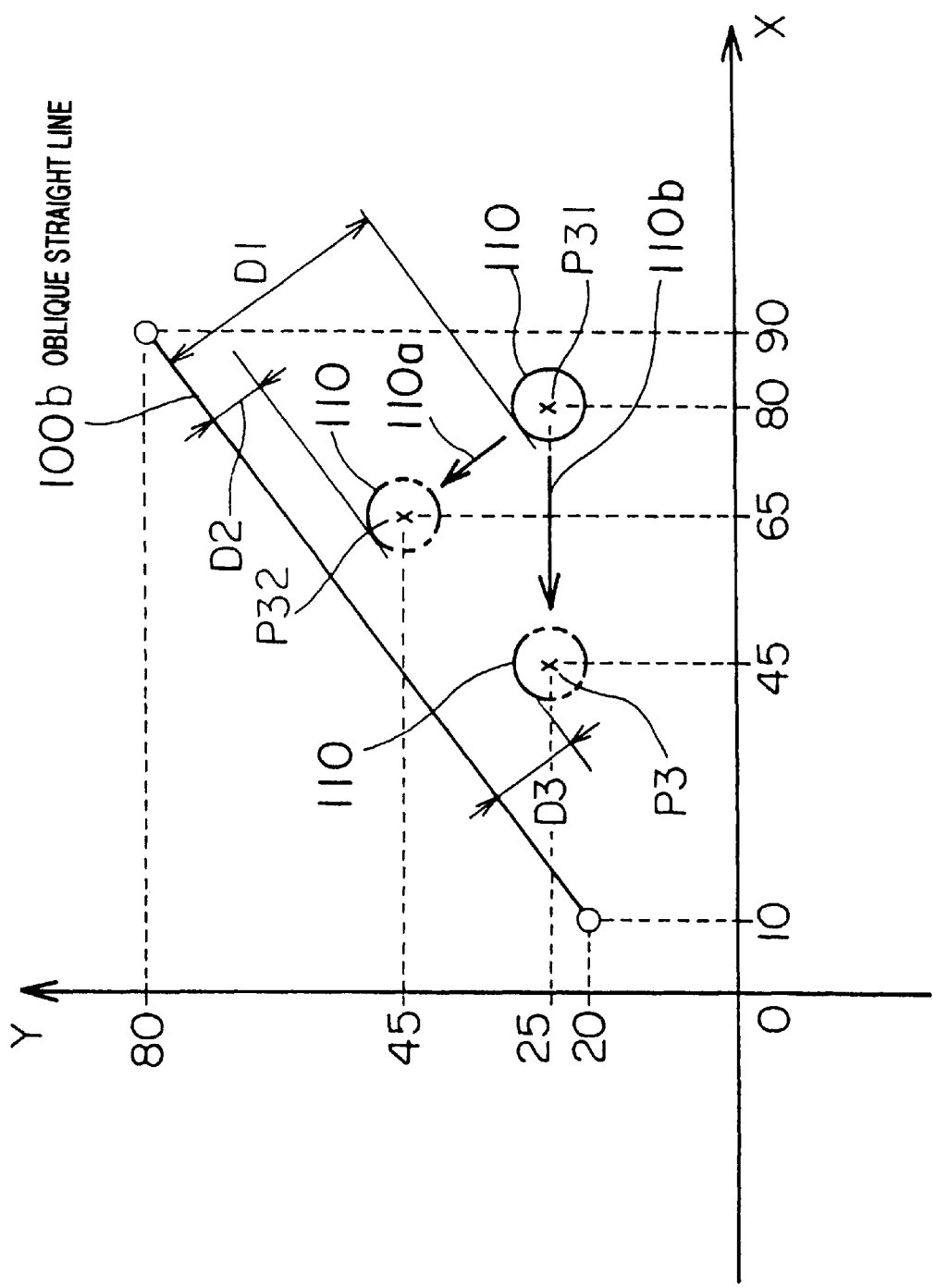
FIG. 11 is a view showing distances between tools and a designated shape.
Figure 12:
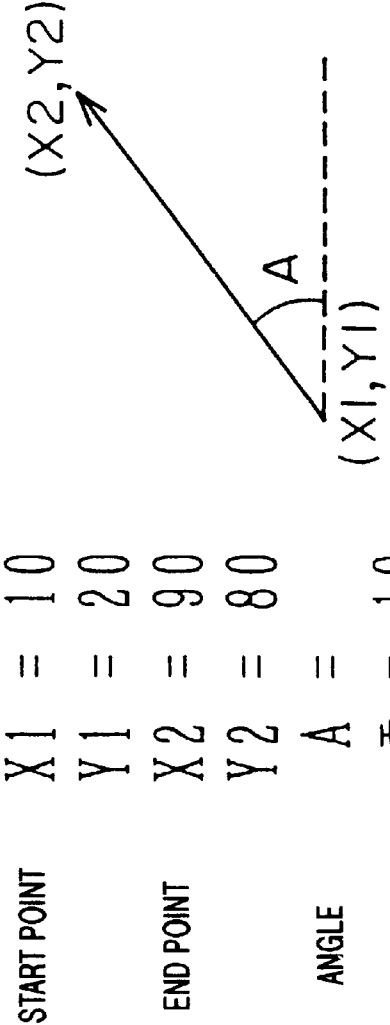
FIG. 12 is a view showing a screen display image indicating a distance in a normal direction by way of example.

FIG. 11 is a view showing a distance between a tool and a designated shape and FIG. 12 is a view showing a screen display image showing a distance in a normal direction by way of example.

In FIG. 11, an oblique straight line 100b is defined on the plane of X- and Y-coordinate axes as a designated shape. The oblique straight line 100b is a graphic (designated shape) entered and stored by graphic storing means 1b (FIG. 13) to be described later. A tool 110 has a center located at a point P31 or (X, Y)=(80, 25) at present.

First, the selector switch 41b of FIG. 2 is set to the direction (G) corresponding to the designated shape and the changeover switch 43 is set to the "V (vertical movement)" side. Then, when the handle 41a is turned to the left, the tool 110 is moved in a normal direction 110a with respect to the oblique straight line 100b in accordance with a turning angle of the handle 41a. Further, when the selector switch 41b is set to the X-axis direction (X) and the handle 41a is turned to the left, the tool 110 is moved in a direction 100b parallel to the X-axis in accordance with a turning angle of the handle 41a.

In FIG. 12, a screen display image 16b is displayed on the display unit 16 of FIG. 1. The screen display image 16b is an image in which the tool 110 is located at the point P31 and shows the present position of the tool and the designated shape stored.

A present position of the tool, i.e., a center of the tool at the point P31 is displayed by the positions on the X-axis (X), Y-axis (Y) and Z-axis (Z) in the upper left area of the screen display image 16b. In the same way, a distance (D) between the tool and the designated shape and a tool diameter (ø) are displayed in the upper right area of the display screen. The value of a distance D1 between the point P31 and the oblique straight line 100b is displayed as the distance (D) between the tool and the designated shape in the upper right area of the display screen.

Further, the definition information of the oblique straight line 100b shown in FIG. 11 is displayed in the lower left area of the screen display image 16b as the values of a start point (X1, Y1), an end point (X2, Y2), an angle (A) and a tool diameter (ø). In the same way, the oblique straight line is graphically shown together with the definition information thereof in the lower right area of the display screen to visually determine the designated shape.

When the tool 110 located at the point P31 in FIG. 11 is moved in a direction 110a so that the center of the tool 110 is located at a point P32 or (X, Y)=(65, 45), a distance between the point P32 and the oblique straight line 100b is set to a distance D2. At this time, the distance (D) between the tool 110 and the designated shape displayed is changed to "11.000" in the upper right area of the screen display image 16b.

In the same way, when the tool 110 located at the point P31 in FIG. 11 is moved in a direction 100b so that the center of the tool 110 is located at a point P33 or (X, Y)=(45, 25), a distance between the point P33 and the oblique straight line 100b is set to a distance D3. At this time, the distance (D) between the tool 110 and the designated shape displayed in its upper right area is changed to "13.000".

As described above, when the operator moves a tool by operating the machine control console 40, the distance (D) between the tool and the designated shape is displayed while being changed in accordance with the movement of the tool. Consequently, a distance between the designated shape and the tool can be found so that a simple machining of a portion of a prototype and the like can be easily carried out.

Figure 13:
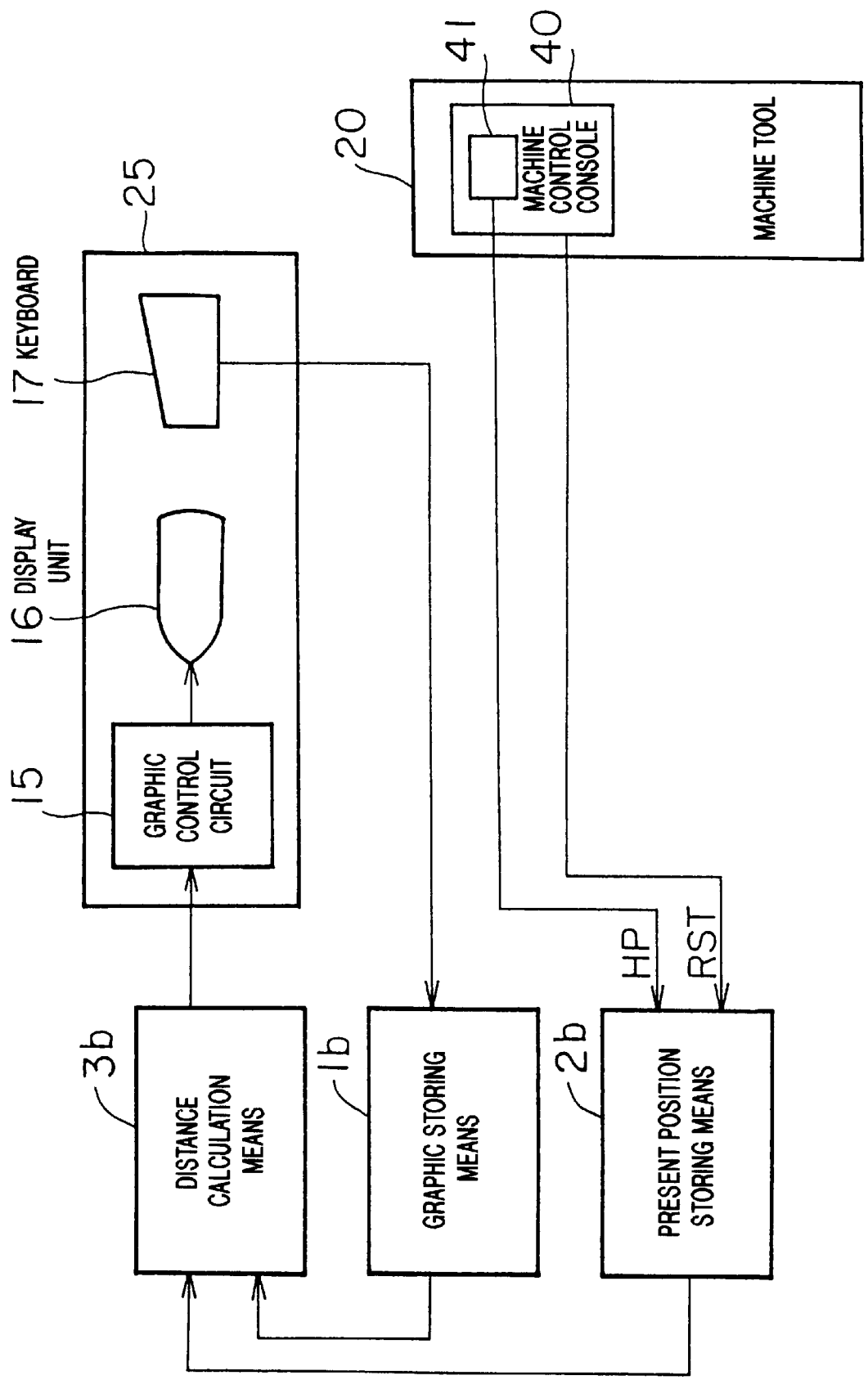
FIG. 13 is a block diagram showing a function of a numerical control apparatus of a third embodiment.

Next, a function of a numerical control apparatus of a third embodiment will be described. FIG. 13 is a block diagram showing the function of the numerical control apparatus of the third embodiment.

The operator enters a designated shape such as an oblique straight line, circular arc or the like by operating a keyboard 17 in accordance with guidance information displayed on a display unit 16 through a graphic control circuit 15. Graphic storing means 1b stores the designated shape entered in an interactive fashion as described above.

When present position storing means 2b detects a pulse signal HP from movement command means by being operated by the operator, it renews and stores the present position of a tool in accordance with the pulse signal HP. Note, the pulse signal HP is entered to each axis. Further, when the present position storing means 2b detects a reset signal RST for each axis from the movement command means, it initializes the present position of the tool of the axis to "0".

Distance calculation means 3b calculates a distance between the designated shape stored in the graphic storing means 1b and the present position of a tool stored in the present position storing means 2b. A calculated result is displayed on the display unit 16 through the graphic control circuit 15.

The graphic storing means 1b, present position storing means 2b and distance calculation means 3b are realized as the function of software.

Next, a processing sequence of the third embodiment will be described.

Figure 14:
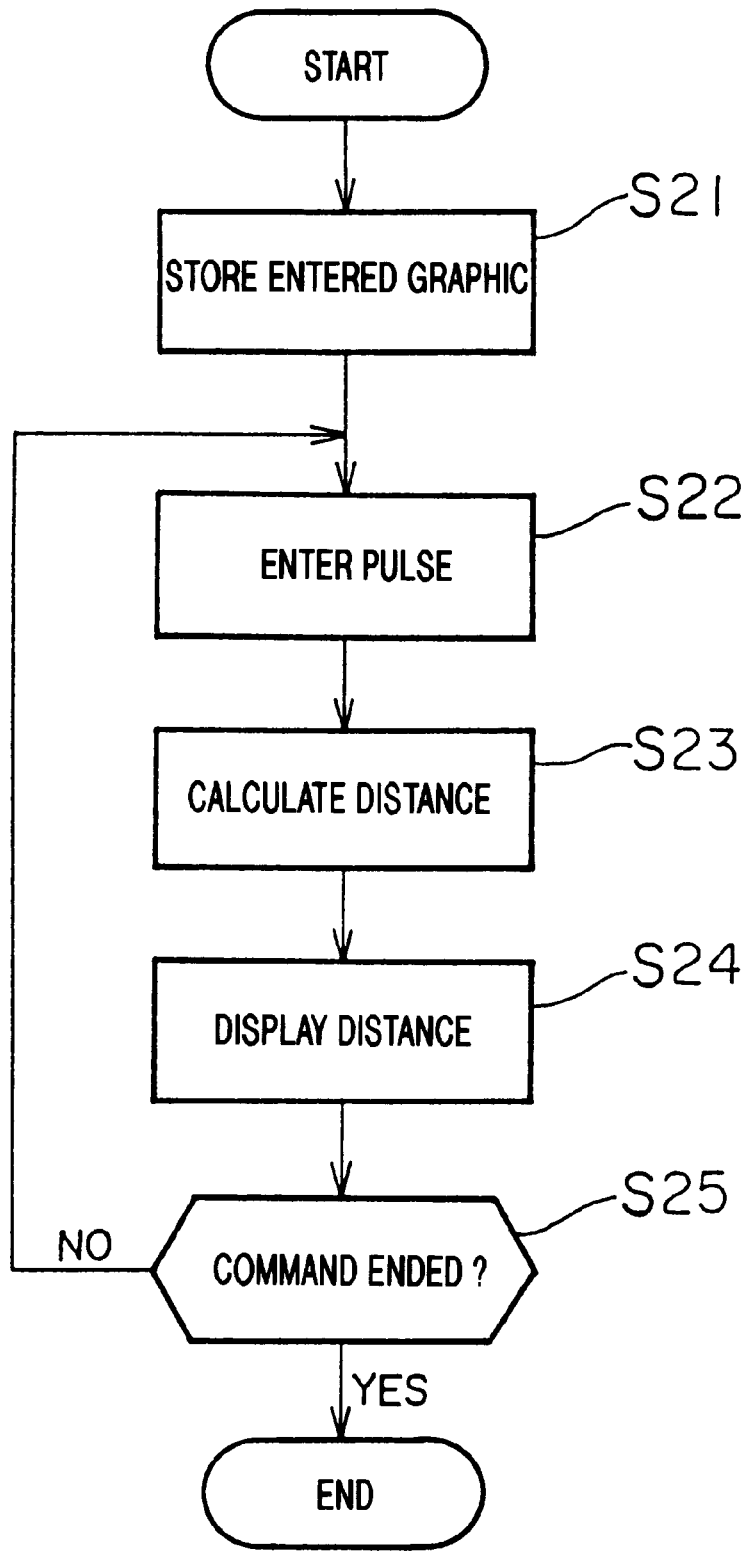
FIG. 14 is a flowchart of the third embodiment.

FIG. 14 is a flowchart showing the processing sequence of the third embodiment. The flowchart shows processing sequences to be carried out by the graphic storing means 1b, present position storing means 2b and distance calculation means 3b. The graphic storing means 1b executes step S21, the present position storing means 2b executes step S22 and the distance calculation means 3b executes the other steps. In FIG. 14, each numeral following to the letter "S" represents a step number.

[S21] An entered graphic is stored. Specifically, a designated shape such as an oblique straight line, circular arc or the like entered by the operator through the keyboard 17 in an interactive fashion in accordance with guidance information displayed on the display unit 16 is stored.

[S22] A pulse is entered. Specifically, a pulse signal HP and a reset signal RST from the movement command means such as a manual pulse generator 41 and the like of FIG. 2 are detected. Further, the present position of a tool is renewed in accordance with the pulse signal HP and reset signal RST.

[S23] A distance is calculated. Specifically, a distance between the designated shape stored at step S21 and the present position of the tool renewed at step S22 (or initialized to "0") is calculated. Since a calculation method is the same as a conventional method of calculating a distance between a mathematically determinable point and a straight line or a circular arc, the description of the method is omitted.

[S24] The distance is displayed. Specifically, the distance is displayed on the screen display image 16b as shown in FIG. 12 of the display unit 16 through the graphic control circuit 15.

[S25] Whether an end command is entered or not is determined. Specifically, whether or not the end command is entered from the movement command means or a keyboard 17 is determined. If the end command is entered (YES), the processing sequence is ended, and if not (NO), the process returns to step S22.

As described above, when the operator enters the designated shape in accordance with the guidance information and then operates a machine control console 40, a distance between the designated shape and the present position of the tool can be found. Thus, a machining and the like of a portion of a prototype can be easily realized.

Although the above embodiment has been described with respect to a milling machine, the present invention is also applicable to a lathe and the like in the same way.

The above guidance function may be incorporated in an ordinary numerical control apparatus, or may be arranged as an especially inexpensive numerical control apparatus.

As described above, according to the third embodiment, since the graphic storing means stores a designated shape, the present position storing means stores the present position of a tool in response to a pulse signal from the movement command means and the distance calculation means calculates a distance between the present position of the tool and the designated shape and displays the distance on the display unit, the distance between the designated shaped and the present position of the tool can be found. Thus, a portion of a prototype and the like can be easily machined.

Next, a finish machining function of a guidance function of a fourth embodiment will be described.

Figure 15:
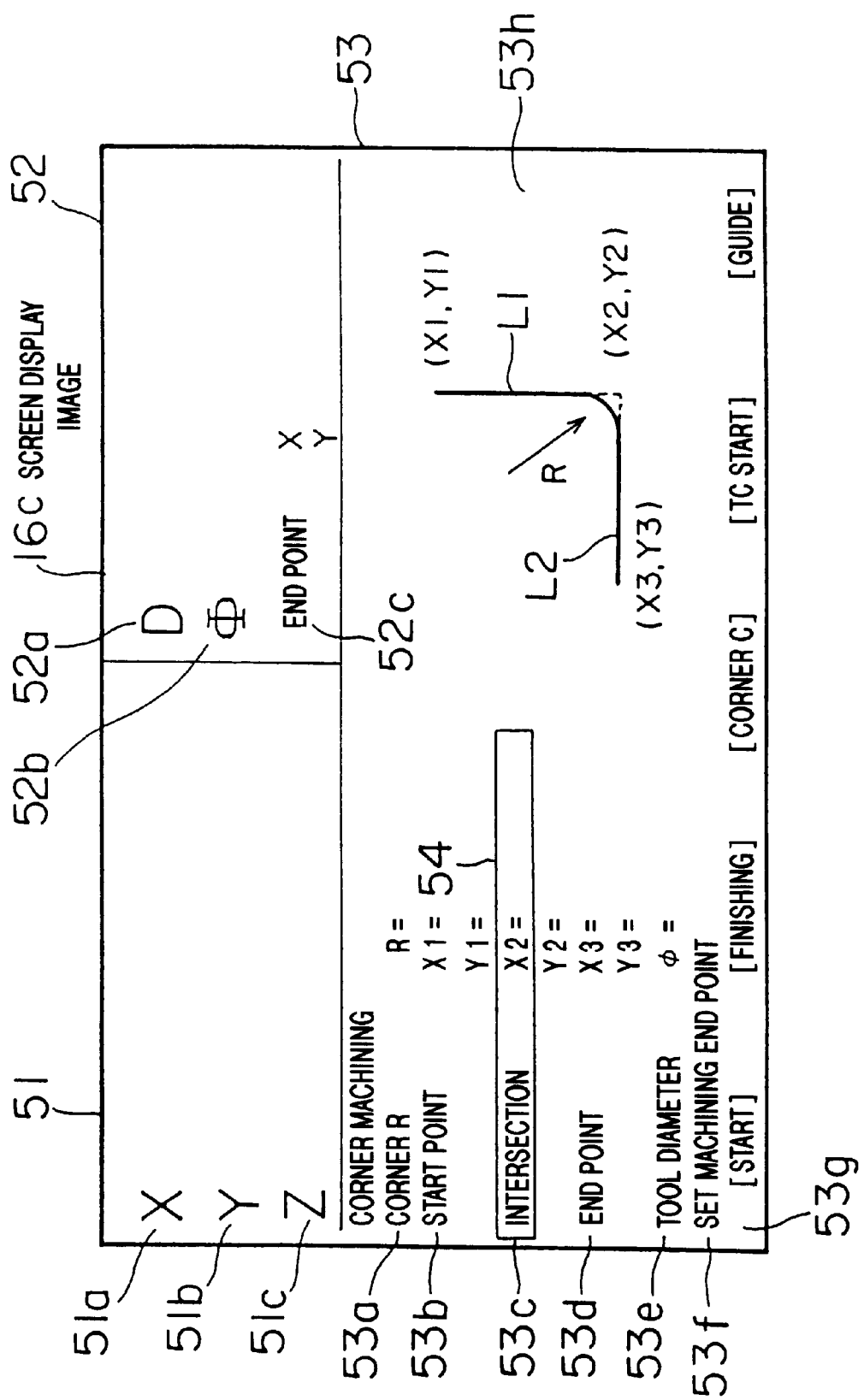
FIG. 15 is a view showing a screen display image of a machining guidance for a finish machining.

FIG. 15 is a view showing a screen display image of a machining guidance for a finish machining. The screen display image of the machining guidance for the finish machining is displayed on a screen display image 16c of the display unit 16. Here, a screen display image of a machining guidance for carrying out a corner machining is shown.

The screen display image 16c includes a present position display column 51 in its upper left area for displaying the present position of a tool, a tool status display column 52 in its upper right area for displaying the current status and the like of the tool, and a data entering image 53 in its lower area for entering machining data, respectively. The present position display column 51 includes an X-coordinate column 51a, a Y-coordinate column 51b, and a Z-coordinate column 51c as the present position of the tool. The tool status display column 52 includes a distance display column 52a for indicating a distance (D) between the tool and a designated shape, a tool diameter display column 52b for indicating a tool diameter (ø), and a machining end point display column 52c for indicating a machining end point to be described later.

Data entering image 53 displays in its right area a corner machining finished status diagram 53h. A finished status of a workpiece is determined by the values of a start point (X1, Y1) of a straight line L1, an end point (X3, Y3) of a straight line L2, a point of intersection (X2, Y2) of the straight line L1 and the straight line L2, and a corner R.

Thus, the data entering image 53 includes in its left area a corner R entering column 53a, a start point entering column 53b of the straight line L1, a point of intersection entering column 53c of the straight line L1 and the straight line L2, and an end point entering column 53d of the straight line L2. In addition to the above, the data entering image 53 also includes a tool diameter (ø) entering column 53e, a message display column 53f, and a software key menu column 53g. When a corresponding software key on a keyboard 17 is pressed, each menu is selected in the software key menu column 53g and a content of the image is changed. When data is to be entered to the respective entering columns 53a–53g, the data is entered by moving a cursor 54 to the column to which the data is to be entered.

In the machining guidance screen display image for the finish machining, when data is entered to the respective data entering columns of the data entering image 53, the entering of data to the tool diameter entering column 53e is finished and then the [FINISH MACHINING] of the software menu column 53g is selected, the message display column 53f displays a flick ering mess age [SET MACHINING END POINT]. At the same time, the cursor 54 automatically moves to the machining end point display column 52c of the tool status display column 52.

The machining end point means a position to which a tool finally escapes and stops there when the finish machining of the workpiece is ended. When the machining end point has been entered, the message display column 53f displays a message "move to a machining start point and press [START]". The operator operates the manual pulse generator 41 or jog feed buttons 42 in accordance with the message and moves the tool to the machining start point. When the [START] is selected, a corner machining finish mode is set in accordance with the machining guidance.

Figure 16:
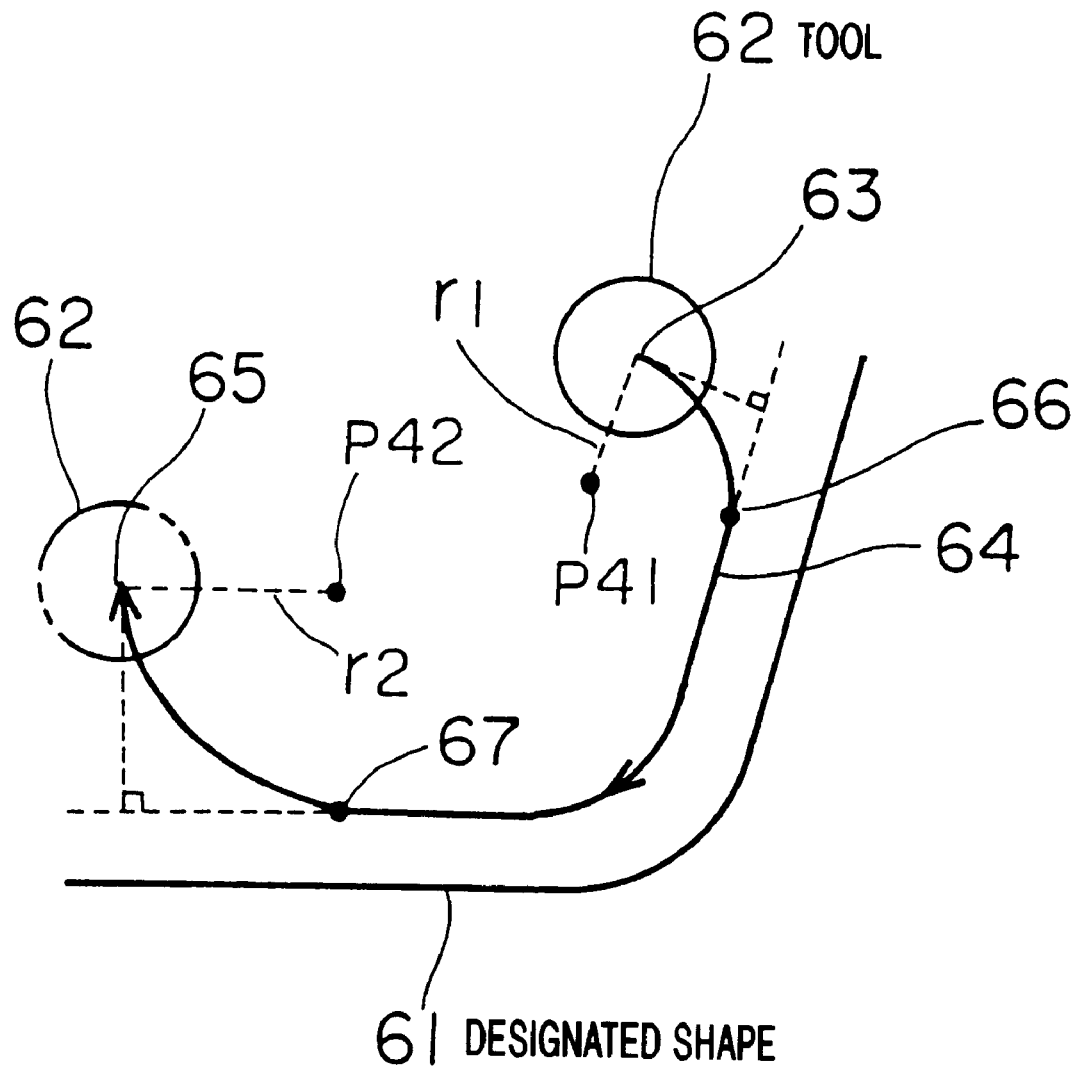
FIG. 16 is a view showing a tool moving process in a corner finish machining mode.

FIG. 16 is a view showing a tool moving process in the corner machining finishing mode, in which a designated shape 61 shown therein is to be finish machined. First, the operator moves a tool 62 to a machining start point 63 by operating the manual pulse generator 41 or the jog feed buttons 42. When the operator selects [START] at the machining start point 63, the tool 62 approaches and reaches a cutting start point 66 along a circular arc path. The circular arc path has a radius r1 having a length equal to a normal line from the machining start point 63 to a tool path 64 and moves about a point P41.

On arriving at the cutting start point 66, the tool 62 moves on the tool path 64 along the designated shape 61 in accordance with a speed commanded by the manual pulse generator 41 or the jog feed buttons 42. On arriving at a cutting end point 67, the tool 62 carries out an escape motion along a circular arc path and finishes all the motions. The circular arc path has a radius r2 having a length equal to a normal line from the machining finish point 65 to the tool path 64 and moves about a point P42.

As described above, according to the present invention, when the tool 62 carries out the approach motion and escape motion in the finish machining, it moves along the circular arc paths, respectively. Thus, a cutter mark is prevented from being formed to a cut surface so that a finished shape can be improved.

Although the above description shows the inside machining of the corner R by way of example, the present invention may be also applicable to the machining of the outside thereof as well as to other machining modes such as the machining of a corner C, straight line, circle and the like.

Although the above embodiment has been described with respect to a milling machine, the present invention is also applicable to a lathe and the like in the same way.

The above guidance function may be incorporated in an ordinary numerical control apparatus, or may be arranged as an especially inexpensive numerical control apparatus.

As described above, according to the fourth embodiment, since a tool is approached to a tool path along a designated shape, when the tool reaches a machining start point designated by the operator, it is approached to a cutting start point on the tool path along a circular arc path, and on the completion of the approach of the tool to the cutting start point, the tool moves along the tool path, the formation of a cutter mark is prevented when the tool approaches a workpiece. As a result, a finished shape can be improved.

Figure 17:
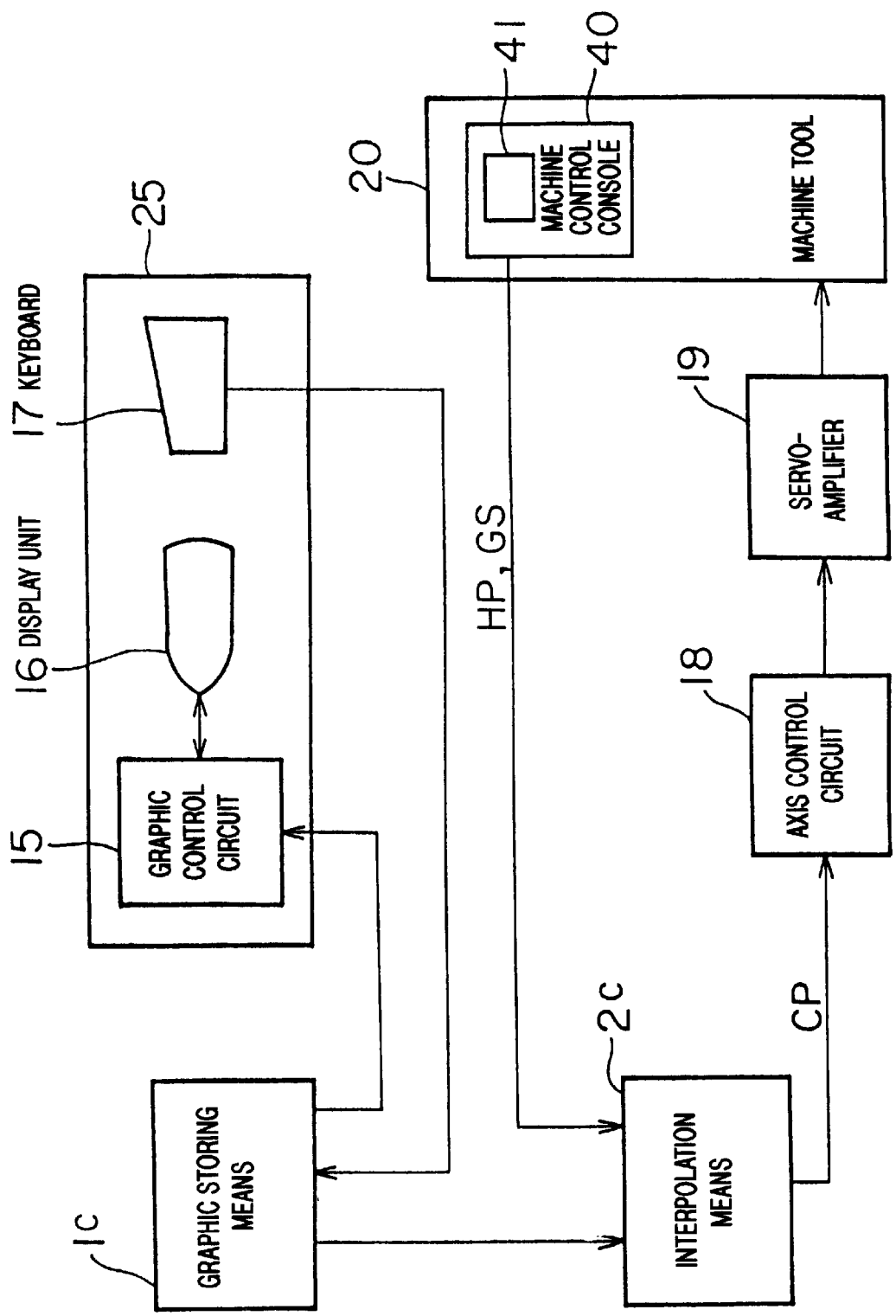
FIG. 17 is a block diagram showing a function of a numerical control apparatus of a fourth embodiment.

FIG. 17 is a block diagram showing a function of a numerical control apparatus of the fourth embodiment. Graphic storing means 1c displays guidance information on a display unit 16 through a graphic control circuit 15. The graphic storing means 1c also stores a designated shape such as a straight line, circular arc or the like entered by the operator through a keyboard 17 in an interactive fashion. The designated shape stored is displayed on the display unit 16 through the graphic control circuit 15 when necessary.

On receiving a pulse signal HP and a moving direction signal GS from movement command means such as a manual pulse generator 41 and the like, interpolation means 2c causes a tool to approach a tool path along the designated shape stored in the graphic storing means 1c, further when the tool reaches a preset machining start point, the tool is approached to a cutting start point on the tool path along a circular path, and on the completion of the approach motion, an interpolated pulse signal CP is sent to an axis control circuit 18 so that the tool moves along the tool path. The axis control circuit 18 is actually provided for each of three axes. The axis control circuit 18 generates a speed command for each axis in response to the interpolated pulse signal CP output from the interpolation means 2c and supplies the speed command to a servoamplifier 19. The servoamplifier 19 controls a machine tool 20 by energizing servomotors mounted thereon.

The graphic storing means 1c and interpolation means 2c are realized as the function of software.

A numerical control apparatus may be arranged so as to include all of the functions of the above respective embodiments or to selectively include the functions.

The present invention is not limited to the above embodiments, but various changes and modifications may be made therein without departing from the scope of the invention.

We claim:

1. A numerical control apparatus for controlling a machine tool having at least two axes, comprising:

graphic storing means for interactively storing a designated shape for machining a workpiece which is one of an oblique straight line and a circular arc;

changeover means for outputting a changeover signal in response to a single manual operation, wherein the changeover signal commands parallel movement of a tool with respect to the designated shape or normal movement of the tool in a forward or backward direction along a normal line segment with respect to the designated shape;

first movement command means for outputting a first movement signal commanding movement of the tool in a first direction;

second movement command means for outputting a second movement signal commanding movement of the tool in a second direction different than the first direction;

interpolation means for combining the first and second movement signal and outputting an interpolated pulse signal in response to the changeover signal;

axis control means for outputting an axis movement command based on the interpolated pulse signal; and a servo-amplifier to drive the tool in response to the axis movement command, wherein the tool is driven in the first direction and then driven in the second direction in response to said manual operation.

2. A numerical control apparatus according to claim 1, wherein said first movement command means comprises a manual pulse generator.

3. A numerical control apparatus according to claim 1, wherein said first movement command means comprises jog feed buttons.

4. A numerical control apparatus according to claim 1, wherein said interpolation means further stops the output of said interpolated pulse signal when said tool reaches predetermined coordinate values.

5. A numerical control method of controlling a machine tool having at least two axes, comprising the steps of:

interactively storing a designated shape for machining a workpiece which is one of an oblique straight line and a circular arc;

receiving a first signal commanding a first axis and a second signal commanding a second axis, and receiving a pulse signal commanding movement of the machine tool;

combining the first signal and the second signal with the pulse signal;

outputting an interpolated pulse signal in accordance with the combined first signal, second signal, and pulse signal such that the machine tool is driven in a first direction and then driven in a second direction in response to the interpolated pulse signal.

6. A numerical control apparatus for controlling a machine tool, comprising:

graphic storing means for interactively storing a designated shape for machining a workpiece including one of the following unit shapes: an oblique straight line, a circle, and a circular arc, a composite shape made by combining at least two of said unit shapes, or a curved shape including a spline curve;

movement command means for outputting a pulse signal commanding a movement of the tool in response to a single manual operation;

first movement command means for outputting a first movement signal commanding movement of the tool in a first direction;

second movement command means for outputting a second movement signal commanding movement of the tool in a second direction different than the first direction;

present position storing means for renewing and storing a present position of the tool in response to the pulse signal and the first and second movement signals;

point of intersection determination means for determining a point of intersection of the designated shape and the present position of the tool and outputting a determination signal; and interpolation means for combining the first movement signal and the second movement signal and outputting an interpolated pulse signal in response to the determination signal such that the tool is moved in a first direction then a second direction in response to the single manual operation.

7. A numerical control apparatus according to claim 6, wherein said point of intersection determination means outputs said pulse signal as said determination signal until said present position reaches the point of intersection thereof with said designated shape and outputs a position signal along said designated shape as said determination signal after said present position has reached said point of intersection with said designated shape.

8. A numerical control apparatus according to claim 7, wherein after said present position has reached said point of intersection with said designated shape, said point of intersection determination means makes the unit vector of said pulse signal equal to the unit vector of said position signal.

9. A numerical control apparatus for controlling a machine tool having at least two axes, comprising:

graphic storing means for storing a designated shape for machining a workpiece which is one of an oblique straight line and a circular arc entered in an interactive fashion in accordance with guidance information;

first movement command means for outputting a first movement signal commanding movement of the tool in a first direction;

second movement command means for outputting a second movement signal commanding movement of the tool in a second direction different than the first direction;

interpolation means for combining the first and second movement signal and outputting an interpolated pulse signal in response to the changeover signal;

present position storing means for storing a present position of the tool in response to the pulse signal; and distance calculation means for calculating a distance between the present position of the tool and the designated shape and displaying the distance on a display unit, wherein the tool is driven in the first direction and then driven in the second direction in response to said changeover signal without changing said changeover signal.

10. A numerical control apparatus according to claim 9, wherein said distance calculation means includes tool diameter correction means for correcting a tool diameter when the distance in a normal direction is calculated.

11. A numerical control apparatus for controlling a machine tool, comprising:

a graphic storing means to interactively store a shape for machining a workpiece;

a manual pulse generator to output a pulse signal commanding movement of the tool in response to a single manual operation;

first movement command means for outputting a first movement signal commanding movement of the tool in a first direction;

second movement command means for outputting a second movement signal commanding movement of the tool in a second direction different than the first direction; and interpolation means for combining the first and second movement signal and outputting an interpolated pulse signal in response to the changeover signal, wherein the tool is driven in the first direction and then driven in the second direction in response to the single manual operation.

12. A numerical control apparatus for controlling a machine tool having at least two axes, comprising:

graphic storing means for interactively storing a designated shape for machining a workpiece which is one of an oblique straight line and a circular arc entered by an operator;

means for outputting a pulse signal in accordance with a moving speed of the tool which is in accordance with a single manual command entered by the operator;

first movement command means for outputting a first movement signal commanding movement of the tool in a first direction;

second movement command means for outputting a second movement signal commanding movement of the tool in a second direction different than the first direction; and interpolation means for combining the first and second movement signal, and for outputting an interpolated pulse signal to cause the tool to approach a tool path along the designated shape in accordance with the pulse signal, to cause the tool to approach a cutting start point located on the tool path along a circular arc path when the tool reaches a machining start point designated by the operator and to move the tool along the tool path after the tool has approached the cutting start point, wherein the tool is driven in the first direction and then driven in the second direction in response to said single manual command entered by the operator.

13. A numerical control apparatus according to claim 12, wherein said means for outputting a pulse signal is a manual pulse generator.

14. A numerical control apparatus according to claim 12, wherein said movement command means is a plurality of jog feed buttons.

15. A numerical control apparatus according to claim 12, wherein the interpolation means outputs an interpolated pulse signal to cause the tool to escape to a preset machining end point along the circular arc path when the tool reaches the cutting end point on the tool path.

16. A numerical control apparatus according to claim 15, wherein a radius of a track for said escape motion along said circular arc path is a distance of a normal line from said machining end point to said cutting end point.

* * * * *

UNITED STATES PATENT AND TRADEMARK OFFICE
CERTIFICATE OF CORRECTION

PATENT NO. : 5,920,170
DATED : July 6, 1999
INVENTOR(S) : Masaki SEKI, et al.

It is certified that error appears in the above-identified patent and that said Letters Patent is hereby corrected as shown below:

On the title page;
item [30] Foreign Application Priority Data
No. 4-271325, change "October 8, 1992" to --October 9, 1992--.

Col. 1, line 14, delete "Background".

Col. 1, line 21, change "apparatus" to --apparatuses--.

Col. 1, lines 23-24, change "apparatuses" to --apparatus--.

Col. 1, line 36, change "these" to --These-- and delete "and".

Col. 4, line 29, change "EMBODIMENT" to --EMBODIMENTS--.

UNITED STATES PATENT AND TRADEMARK OFFICE
CERTIFICATE OF CORRECTION

PATENT NO. : 5,920,170
DATED : July 6, 1999
INVENTOR(S) : Masaki SEKI, et al.

It is certified that error appears in the above-identified patent and that said Letters Patent is hereby corrected as shown below:

Col. 14, line 13, change "100b" to --110b--.

Col. 16, line 26, change "flick ering" to --flickering-- and change "mess age" to --message--.

Signed and Sealed this

Fourteenth Day of December, 1999

Attest:

Attesting Officer

Q. TODD DICKINSON

Acting Commissioner of Patents and Trademarks